US009287076B2

(12) United States Patent
Kudo et al.

(10) Patent No.: US 9,287,076 B2
(45) Date of Patent: Mar. 15, 2016

(54) FUSIBLE LINK UNIT

(75) Inventors: Toshiharu Kudo, Makinohara (JP); Norio Matsumura, Makinohara (JP); Masashi Iwata, Makinohara (JP); Daigoro Fujii, Makinohara (JP); Syouichi Nomura, Makinohara (JP); Tatsuya Aoki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 739 days.

(21) Appl. No.: 12/496,692

(22) Filed: Jul. 2, 2009

(65) Prior Publication Data

US 2010/0019572 A1 Jan. 28, 2010

(30) Foreign Application Priority Data

Jul. 25, 2008 (JP) ................................ 2008-192643

(51) Int. Cl.

| | |
|---|---|
| ***H02H 7/18*** | (2006.01) |
| ***H01H 85/20*** | (2006.01) |
| ***H01H 85/044*** | (2006.01) |
| *H01H 85/02* | (2006.01) |
| *H01H 85/055* | (2006.01) |

(52) U.S. Cl.
CPC ....... *H01H 85/044* (2013.01); *H01H 2085/025* (2013.01); *H01H 2085/0555* (2013.01)

(58) Field of Classification Search
CPC .................... H01H 85/044; H01H 2085/0555; H01H 2085/025
USPC .......................................... 337/186, 207-209
See application file for complete search history.

(56) References Cited

U.S. PATENT DOCUMENTS

| | | | | |
|---|---|---|---|---|
| 5,594,403 | A * | 1/1997 | Taga et al. | 337/186 |
| 5,805,047 | A * | 9/1998 | De Villeroche et al. | 337/290 |
| 6,294,978 | B1 * | 9/2001 | Endo et al. | 337/166 |
| 6,509,824 | B2 * | 1/2003 | Inaba et al. | 337/295 |
| 6,512,443 | B1 * | 1/2003 | Matsumura et al. | 337/189 |
| 6,723,920 | B2 * | 4/2004 | Higuchi et al. | 174/50 |
| 6,806,421 | B2 * | 10/2004 | Matsumura | 174/50 |
| 6,932,650 | B1 * | 8/2005 | Freitag | 439/620.26 |

(Continued)

FOREIGN PATENT DOCUMENTS

| | | | |
|---|---|---|---|
| DE | 69726158 | T2 | 8/2004 |
| DE | 10200853484 | A1 | 5/2009 |

(Continued)

OTHER PUBLICATIONS

German Office Action issued in Application No. 10 2009 034 040.8, dated Nov. 30, 2010.

(Continued)

*Primary Examiner* — Anatoly Vortman
(74) *Attorney, Agent, or Firm* — Sughrue Mion, PLLC

(57) ABSTRACT

A fusible link unit which is fastened to a battery post clamp terminal clamped to an on-vehicle battery, includes: a bus bar made from a metal plate and including: a battery terminal including at least two mounting edges, and a plurality of fastening holes provided thereon and through which a fastening member of the battery post clamp terminal is inserted, each of the fastening holes corresponding to a respective one of the mounting edges; and at least one fusible portion provided at a side of the bus bar opposite to the battery terminal; and a resin case covering the bus bar except for the at least one fusible portion.

8 Claims, 15 Drawing Sheets

(56) References Cited

U.S. PATENT DOCUMENTS

| | | | | |
|---|---|---|---|---|
| 7,663,466 | B1 * | 2/2010 | Jetton | 337/191 |
| 2005/0285709 | A1 | 12/2005 | Matsumura et al. | |
| 2006/0003627 | A1 * | 1/2006 | Freitag | 439/504 |
| 2006/0091855 | A1 * | 5/2006 | Seo | 320/116 |
| 2009/0108981 | A1 | 4/2009 | Iwata et al. | |

FOREIGN PATENT DOCUMENTS

| | | | |
|---|---|---|---|
| EP | 0924734 | B1 | 12/1997 |
| JP | 5-15297 | U | 2/1993 |
| JP | 2005-190735 | A | 7/2005 |
| JP | 2007-087823 | A | 4/2007 |

OTHER PUBLICATIONS

Communication drafted Aug. 1, 2012 by the Japanese Patent Office in counterpart Japanese Application No. 2008-192643.

* cited by examiner

FUSIBLE LINK UNIT

CROSS-REFERENCE TO RELATED APPLICATIONS

This application claims priority from Japanese patent application No. 2008-192643 filed on Jul. 25, 2008, the entire subject matter of which is incorporated herein by reference.

TECHNICAL FIELD

This invention relates to a fusible link unit including a battery terminal and at least one fusible portion so as to form a bus bar. The battery terminal is combined with a battery post-clump terminal member which is clumped to a battery post of a on-vehicle battery. The battery terminal is formed at one end side of a conductive metal plate. The fusible portion is fused when an over current flows on another end side which is rearward of the metal plate as compared to the battery terminal. The bas bar is able to be commonly used for a plurality kinds of vehicles.

BRIEF DESCRIPTION OF THE RELATED ART

Generally, an on-vehicle battery serving as a drive source for driving an electrical system is mounted within a bonnet or a trunk room of a vehicle, and a pair of battery posts (indicated respectively as a plus electrode (positive electrode) and a minus electrode (negative electrode) by a red mark and a black mark) are formed in an exposed manner on the on-vehicle battery.

Various forms of fusible link units of the battery direct-mounting type are used. The fusible link units protect an electronic circuit of the electrical system by connecting a fuse to the battery post of the plus electrode (positive electrode) side when the electrical system and the pair of battery posts provided on the on-vehicle battery are connected, for example.

For example, there is a related fusible link unit (see, JP2005-190735A) including a battery terminal which is combined to a battery post clump member and formed at one end side of a bas bar using a conductive metal plate, and at least one fusible portion having a fuse function which is formed at another side of a bas bar which is rearward as compare to the battery terminal and is connected to a terminal provided in a connector housing.

FIG. 14 is an exploded perspective view showing a condition in which a related fusible link unit is to be mounted on a battery post of an on-vehicle battery through a battery post-clamping terminal member, and FIG. 15 is a fuse circuit diagram in the related fusible link unit.

The related fusible link unit 110 shown in FIG. 14 is disclosed in JP-A-2005-190735, and will now be described briefly with reference to it.

As shown in FIG. 14, the battery post **101*b* of a substantially conical shape is formed on and projects from an upper surface 101*a* of the on-vehicle battery 101, and the related fusible link unit 110 is able to be mounted on the battery post 101*b* through the battery post-clamping terminal member 102** having electrical conductivity.

The battery post-clamping terminal member 102 having electrical conductivity is formed by bending an conductive metal plate into a substantially recumbent U-shape. The battery post clamping terminal member 102 has a round clamp hole **102*a*1 on an one side 102*a* so as to penetrate the metal plate. The battery post 101*b* is inserted into and clamped by the round clamp hole 102*a*1. A groove 102*c* is formed by narrowly cutting out the metal plate from a part of the round clamp hole 102*a*1 to a portion between U-shape bending portions 102*b* and 102*d***.

An adjusting screw 103 is received in the U-shaped bent portions **102*b* and 102*d* of the battery post-clamping terminal member 102, and a nut 104 is screwed on a distal end portion of the adjusting screw 103. By tightening the adjusting screw 103 by the nut 104, the diameter of the clamp hole 102*a*1 gets smaller and the clamp hole 102*a*1 clamps the terminal member 102 to the battery post 101*b* of the on-vehicle battery 101. The related fusible link unit 110 is fastened to the battery post-clamping terminal member 102 by a stud bolt 105 formed upwardly on the other end portion 102*e* of the terminal member 102 which is formed so as to be substantially parallel to the upper surface 101*a* of the on-vehicle battery 101. The stud bolt 105 is spaced a predetermined distance from the center of the clamp hole 102*a*1. The stud bolt 105 is threaded so that a nut 106** is able to be screwed.

The related fusible link unit 110 is designed to be fastened to the battery post-clamping terminal member 102 directly clamped to the battery post **101*b* of the on-vehicle battery 101. This related fusible link unit 110 includes a bus bar 111** which is formed by cutting an electrically-conductive metal plate into a predetermined shape by the use of a pressing machine and then by bending the cut metal plate into an L-shape by the use of a bending machine.

The bus bar 111 has a battery terminal **111*a* and a first alternator terminal 111*b* formed respectively at left and right portions of one end portion of the electrically conductive metal plate which forms the bus bar 111. The battery terminal 111*a* and the first alternator terminal 111*b* are flat so as to be substantially parallel to the upper surface 101*a* of the on-vehicle battery 101. The bus bar 111 has a fastening hole 111*a*2 bored and provided on a distal end mounting edge 111*a*1 of the battery terminal 111*a* for the passage of the stud bolt 105 of the battery post-clamping terminal member 102. The stud bolt 105 passes through the fastening hole 1112 from the back side of the battery terminal 111*a*. Also, the first alternator terminal 111*b* has an another stud bolt 112 which is formed uprightly on the first alternator terminal 111*b***.

The bus bar 111 is bent into an L-shape. One end of the L-shape includes one end portion where the battery terminal **111*a* and the first alternator terminal 111*b* provided. The other side of the L-shape includes a plurality of fusible portions 113** each of which has a fuse function.

The bus bar 111 is covered with an insulative synthetic resin case 114 except for the battery terminal **111*a*, the first alternator terminal 111*b* and the plurality of fusible portions 113. A connector housing 115 is subsequent to the resin case 114**.

As shown in FIG. 15, in a fuse circuit of the related fusible link unit 110, a plurality of load terminals 116 are connected respectively to second ends of the plurality of fusible portions 113 whose first ends are connected to the battery terminal **111*a*. A second alternator terminal 111*c* is formed at that side opposite to the first alternator terminal 111*b*. The plurality of load terminals 116 and the second alternator terminal 111*c* are accommodated within the connector housing 115**.

In this fuse circuit, the first alternator terminal **111*b* is used when an alternator input is large. On the other hand, the second alternator terminal 111*c*** is used when the alternator input is small.

The operation of the related fusible link unit 110 when the battery post-clamping terminal member 102 clamped to the battery post **101*b* of the on-vehicle battery 101 is fastened to the battery terminal 111*a* formed at the one end portion of the bus bar 111 is briefly described below. Electric power is supplied from the on-vehicle battery 101 and an alternator (not shown) and is distributed to the plurality of loads via the fuse circuit including the plurality of fusible portions 113 each performing the fuse function in the fusible link unit 110**.

When a battery level of the on-vehicle battery 101 decreases, electric power is supplied from the alternator to the on-vehicle battery 101 to charge the on-vehicle battery 101. When a current larger than a predetermined value flows through any of the fusible portions 113 due to a short-circuit accident of the load circuit, the corresponding fusible portion 113 melts by heating. Therefore, the related fusible link 110 prevents an accident due to the over-current as described in JP-A-2005-190735.

SUMMARY

The related fusible link unit 110 described in JP-A-2005-190735 is electrically connected to the battery post 101*b* of the on-vehicle battery 101 via the battery post-clamping terminal member 102. However, in this fusible link unit 110, the battery post-clamping terminal member 102 is fastened to the battery terminal 111*a* only from a direction perpendicular to the distal end mounting edge 111*a*1 of the battery terminal 111*a* formed at the one end portion of the bus bar 111. This fastening operation is able to be suitably carried out for a specified kind of vehicle, but not able to be carried out for a plurality of kinds of vehicles, since the fastening hole 111*a*2 is provided on the battery terminal 111*a* in a predetermined distance from the distal end mounting edge 111*a*1.

Therefore, a plurality of kinds of related fusible links 110 corresponding respectively to the plurality of kinds of vehicles have to be prepared, and therefore a plurality of kinds of dies for respectively forming a plurality of kinds of bus bars 111 corresponding respectively to the plurality of kinds of vehicles need to be prepared. As a result, the cost of each bus bar 111 is high, and besides a stock management of the plurality of kinds of fusible link units 110 is complicated.

Furthermore, in the related fusible link unit 110, when the battery terminal 111*a* formed at the one end portion of the bus bar 111 is fastened to the battery post 101*b* of the on-vehicle battery 101 through the battery post-clamping terminal member 102, the vertically-extending other end portion of the L-shaped bus bar 111 hangs down vertically in a cantilever manner in adjacent relation to the outer side surface of the on-vehicle battery 101. However, various boxes, an air cleaner, etc., exist around the on-vehicle battery 101, and a space available around the on-vehicle battery 101 differs depending on the kind of vehicle, and therefore the hanging portion of the bus bar 111 must be located so as to meet with the available space.

It is therefore an object of this invention to provide a fusible link unit which enables a bus bar to be commonly used for a plurality of kinds of vehicle, a battery post-clamping terminal member to be effectively attached and selectively positioned on a suitable position of a periphery of a battery terminal which is formed at an one end of the bus bar, and area for installation of the fusible link unit to be reduced.

According to a first aspect of the present invention, there is provided a fusible link unit which is fastened to a battery post clamp terminal clamped to an on-vehicle battery, includes a bus bar made from a metal plate and including: a battery terminal including at least two mounting edges, and a plurality of fastening holes provided thereon and through which a fastening member of the battery post clamp terminal is inserted, each of the fastening holes corresponding to respective one of the mounting edges; and at least one fusible portion provided at an side of the bus bar opposite to the battery terminal; and a resin case covering the bus bar except for at least one of the fusible portion.

According to a second aspect of the invention, the battery terminal includes two mounting edges and the fastening holes are integrally formed into a twofold leaf shape.

According to a third aspect of the invention, the battery terminal includes three mounting edges and the fastening holes are integrally formed into a trefoil shape.

According to a fourth aspect of the invention, the fastening holes are integrally formed into a single rectangular shape.

According to a fifth aspect of the invention, the fastening holes are respectively formed into a circular shape; and a first distance between a center of a first one of the fastening holes and the respective mounting edge is shorter than a second distance between a center of a second one of the fastening holes and the respective mounting edge.

According to a sixth aspect of the invention, there is provided A fusible link unit which is fastened to a battery post clamp terminal clamped to an on-vehicle battery, includes a bus bar made from a metal plate includes a battery terminal including an edge which is substantially parallel to a side surface of the on-vehicle battery, and an inclined mounting edge inclined from the edge in an angle; and at least one fusible portion provided at an side of the bus bar opposite to the battery terminal; and a resin case covering the bus bar except for at least one of the fusible portion. The battery post clamp terminal is fastened so as to face the inclined mounting edge.

According to a seventh aspect of the invention, the battery terminal further includes a resin position regulation member is provided at lateral ends of the each mounting edge.

According to an eighth aspect of the invention, there is provided A fusible link unit which is fastened to a battery post clamp terminal clamped to a on-vehicle battery, includes a bus bar made from a metal plate including a battery terminal including at least two mounting edges each of which has a concaved line, and a plurality of fastening holes provided thereon through which a fastening member of the battery post clamp terminal is inserted, each of the fastening holes corresponding to respective one of the mounting edges; and at least one fusible portion provided at an side of the bus bar opposite to the battery terminal; a resin case covering the bus bar except for at least one of the fusible portion.

According to a ninth aspect of the invention, the buttery terminal further includes a resin position regulation member is provided at lateral ends of the each mounting edges; and the resin position regulation member has periphery of a same concaved line shape as the mounting edge.

In the fusible link unit of the first to fifth aspects of the invention, the bus bar made of the electrically-conductive metal sheet has the battery terminal formed at the one end portion thereof and adapted to be fastened to the battery post-clamping terminal member clamped to the battery post of the on-vehicle battery, and also has at least one fusible portion connected to the other end portion of the bus bar disposed rearwardly of the battery terminal, and the fusible portion can melt when an over-current flows therethrough. Particularly, at least two mounting edges are formed at the outer periphery of the battery terminal so that the battery post-clamping terminal member can be fastened to the battery terminal from a selected one of the different directions, and the fastening hole for the passage of the fastening member therethrough so as to fasten the battery post-clamping terminal member to the battery terminal is formed through the battery terminal. Therefore, the bus bar can be suitably used in any of a plurality of kinds of vehicles, and the fusible link unit of the invention can be provided at a low cost. The fastening hole formed through the terminal battery can have any of the twofold leaf-shape, the trefoil shape and the rectangular shape (each having the fastening member-receiving portions (hole portions) opposed respectively to the mounting edges) or the round shape such that the position of the fastening hole relative to the mounting edges can be varied.

In the fusible link unit of the sixth aspect of the invention, the bus bar made of the electrically-conductive metal sheet has the battery terminal formed at the one end portion thereof and adapted to be fastened to the battery post-clamping terminal member clamped to the battery post of the on-vehicle battery, and also has at least one fusible portion connected to the other end portion of the bus bar disposed rearwardly of the battery terminal, and the fusible portion can melt when an over-current flows therethrough. Particularly, the battery terminal includes the inclined mounting edge extending from the end of the distal end edge thereof (so disposed as to be generally parallel to the one side surface of the on-vehicle battery) toward the one side surface of the on-vehicle battery and inclined at the predetermined angle relative to the distal end edge, and the battery post-clamping terminal member is fastened to the battery terminal in opposed relation to the inclined mounting edge. Therefore, when the batter post-clamping terminal member is to be clamped to the battery post of the on-vehicle battery mounted, for example, within a trunk room of the vehicle, the operation side in the clamping operation can be directed toward the operator, and therefore the battery post-clamping terminal member can be efficiently and positively clamped to the battery post of the on-vehicle battery, and also the area of installation of the fusible link unit on the on-vehicle battery can be reduced.

In the fusible link unit of the seventh aspect of the invention, the resin-made position regulation members for regulating the position of the battery post-clamping terminal member in the direction lateral to the direction of inserting of the battery post-clamping terminal member are mounted respectively on the left and right portions of each of the mounting edges of the battery terminal. Therefore, the battery post-clamping terminal member can be positively positioned in the direction lateral to the inserting direction.

In the fusible link unit of the eighth and ninth aspects of the invention, the bus bar made of the electrically-conductive metal sheet has the battery terminal formed at the one end portion thereof and adapted to be fastened to the battery post-clamping terminal member clamped to the battery post of the on-vehicle battery, and also has at least one fusible portion connected to the other end portion of the bus bar disposed rearwardly of the battery terminal, and the fusible portion can melt when an over-current flows therethrough, and the bus bar is bent into the generally L-shape so that the other end portion of the bus bar is disposed generally vertically perpendicularly to the battery terminal. Particularly, at least two concavely-curved mounting edges of the generally arc-shape are formed at the outer periphery of the battery terminal so that the battery post-clamping terminal member can be fastened to the battery terminal from a selected one of the different directions, and the fastening hole for the passage of the fastening member therethrough so as to fasten the battery post-clamping terminal member to the battery terminal is formed through the battery terminal. Therefore, the vertically-extending other end portion of the L-shaped bus bar hangs down in adjacent relation to the outer side surface of the on-vehicle battery, and although a space available around the on-vehicle battery varies depending on the kind of vehicle, the battery post-clamping terminal member can be fastened to the battery terminal (formed at the one end portion of the bus bar) from the suitable direction, and therefore the fusible link unit can be used in any of the plurality of kinds of vehicles. In this case, the resin-made positioning member having at least two concavely-curved surfaces equal in shape to the at least two concavely-curved mounting edges is fixedly secured to the outer peripheral portion of the battery terminal such that the at least two concavely-curved surfaces extend respectively along the at least two concavely-curved mounting edges. The battery post-clamping terminal can be properly positioned relative to the battery terminal through a selected one of the concavely-curved surfaces.

BRIEF DESCRIPTION OF THE DRAWINGS

FIG. 1A is an exploded perspective view showing a condition in which the fusible link unit of the first embodiment is to be mounted on a battery post of an on-vehicle battery through a battery post-clamping terminal member, and FIG. 1B is a perspective view of the fusible link unit of the first embodiment as seen from the reverse side thereof.

FIG. 4A is a plan view showing the first form of use of a battery terminal of the bus bar, and FIG. 4B is a perspective view showing the first form of use, and FIG. 4C is a schematic view showing the first form of use in which the fusible link unit is mounted on the on-vehicle battery.

FIG. 5A is a plan view showing the second form of use of the battery terminal of the bus bar, and FIG. 5B is a perspective view showing the second form of use, and FIG. 5C is a schematic view showing the second form of use in which the fusible link unit is mounted on the on-vehicle battery.

FIG. 6A is a plan view showing the third form of use of the battery terminal of the bus bar, and FIG. 6B is a perspective view showing the third form of use, and FIG. 6C is a schematic view showing the third form of use in which the fusible link unit is mounted on the on-vehicle battery.

DETAILED DESCRIPTION OF EXEMPLARY EMBODIMENTS OF THE PRESENT INVENTION

Embodiments (first, second and third embodiments) of fusible link units of the present invention are described with reference to FIGS. 1 to 13.

First Exemplary Embodiment

Figure 1A:
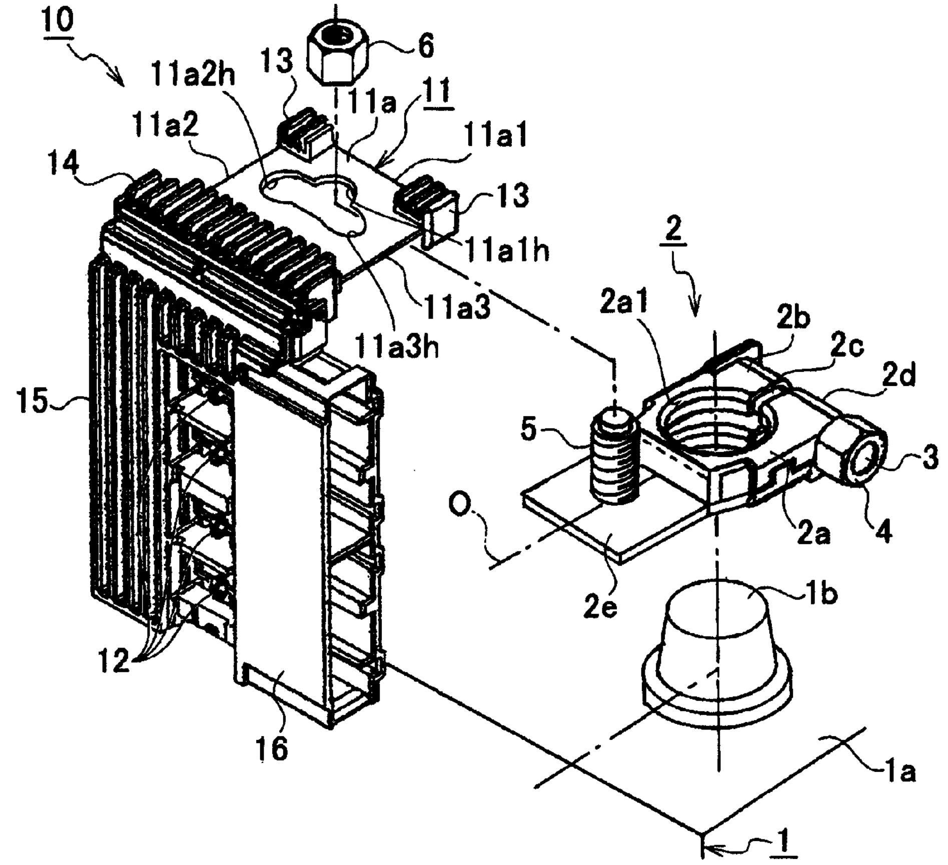
FIGS. 1A and 1B are views explanatory of a first embodiment of a fusible link unit of the present invention.
Figure 1B:
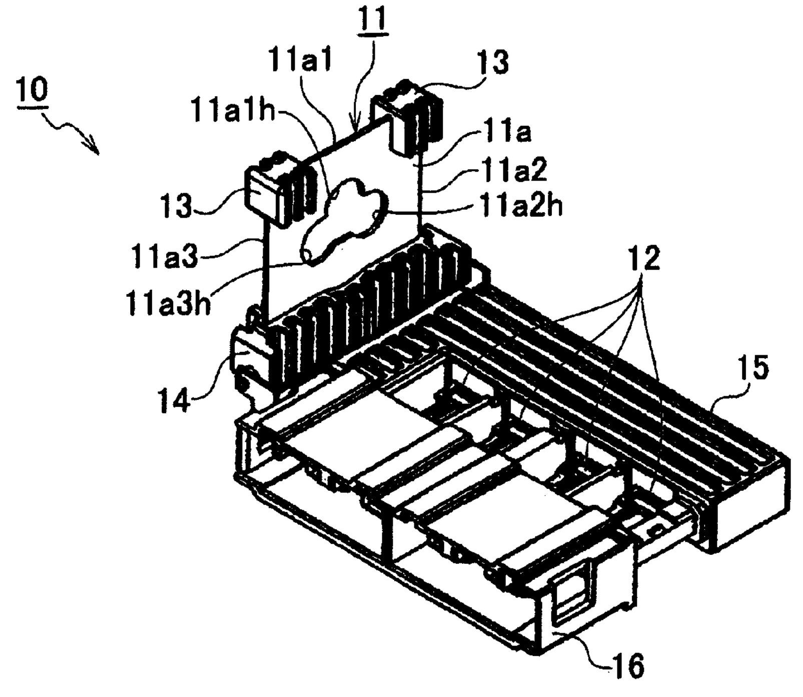
Figure 2C:
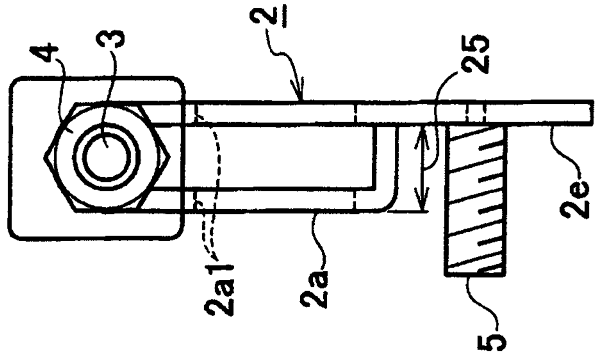
FIGS. 2A, 2B and 2C are a left side-elevational view, a top plan view and a right side-elevational view of the battery post-clamping terminal member of FIG. 1, respectively.
Figure 2B:
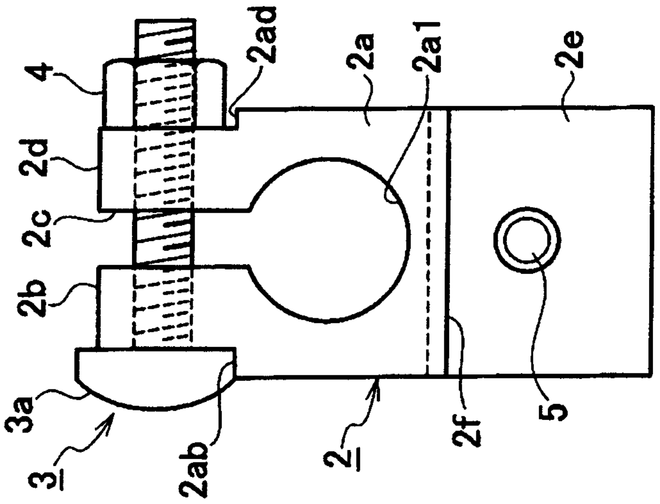
Figure 2A:
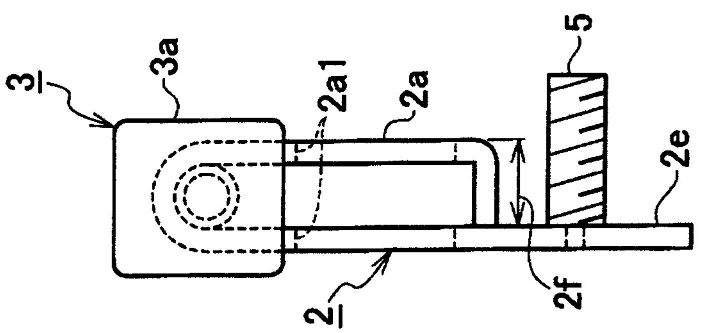
Figure 3:
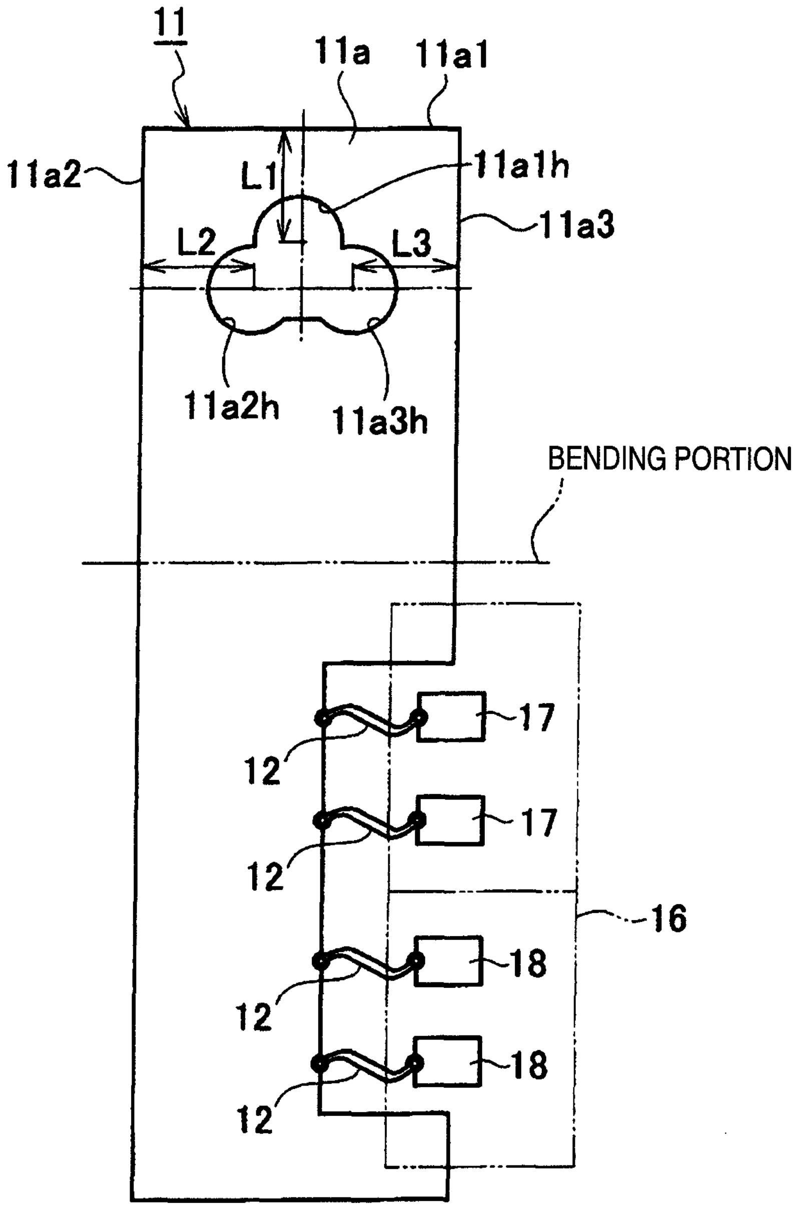
FIG. 3 is a developed view of an electrically-conductive bus bar employed in the fusible link unit of the first embodiment.
Figure 4A:
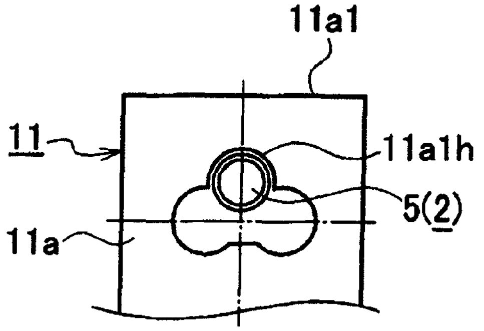
FIGS. 4A, 4B and 4C are views explanatory of a first form of use of the fusible link unit of the first embodiment.
Figure 4B:
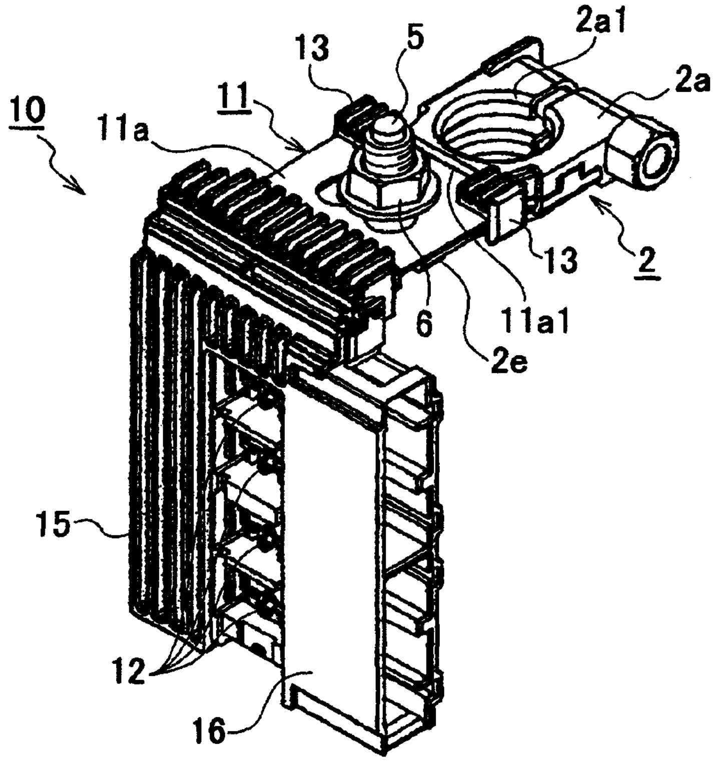
Figure 4C:
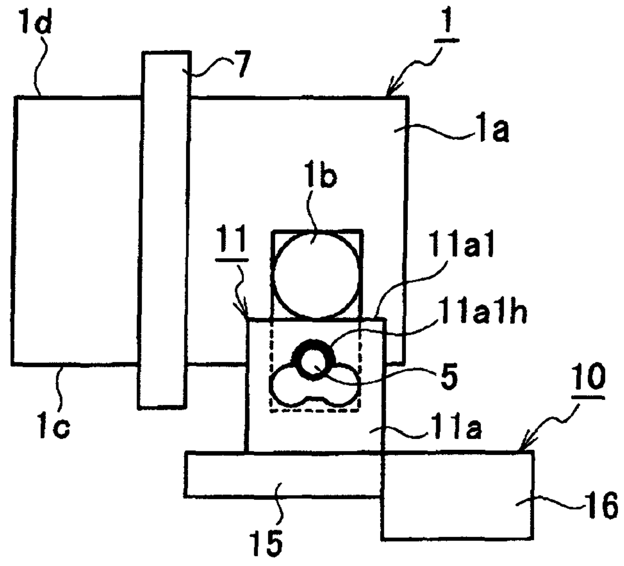
Figure 5A:
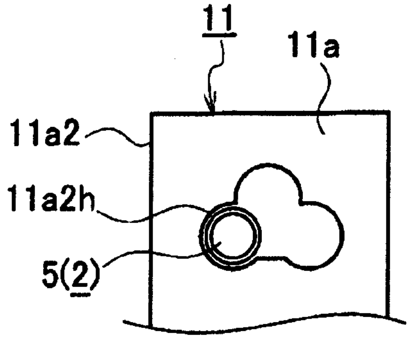
FIGS. 5A, 5B and 5C are views explanatory of a second form of use of the fusible link unit of the first embodiment.
Figure 5B:
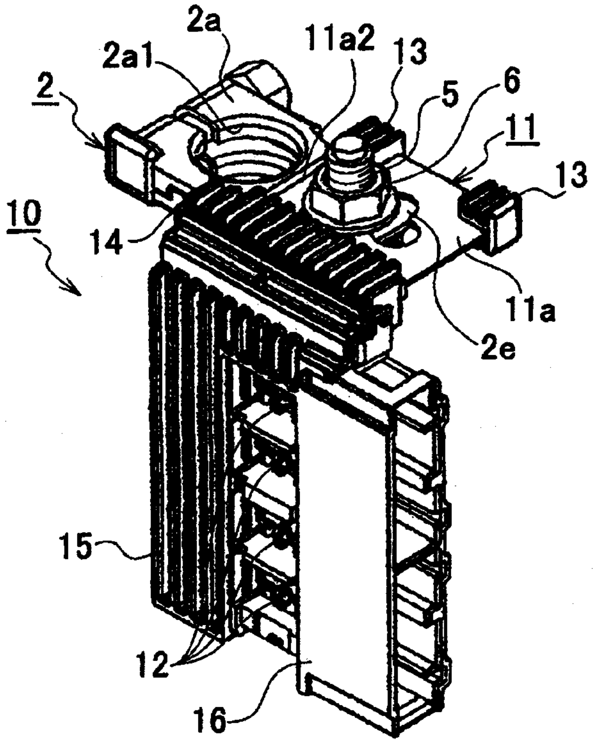
Figure 5C:
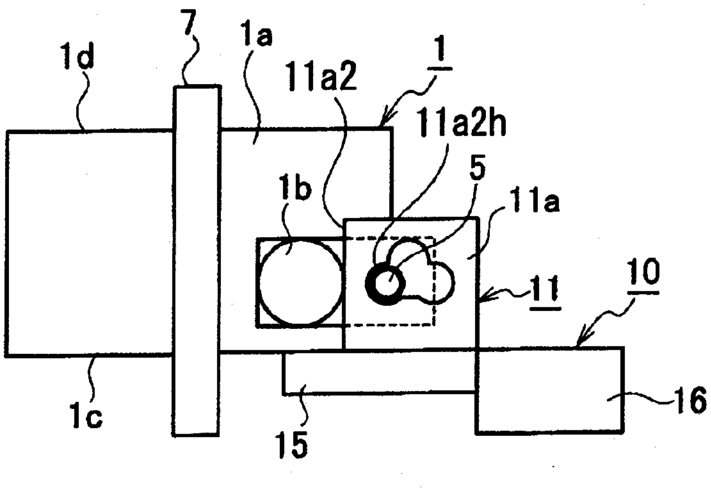
Figure 6A:
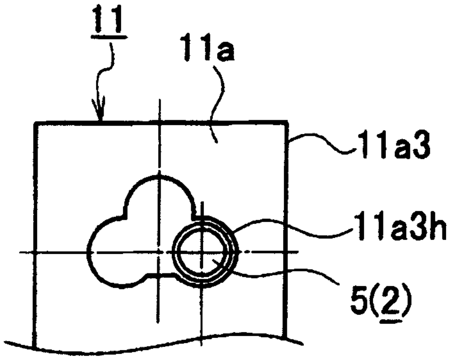
FIGS. 6A, 6B and 6C are views explanatory of a third form of use of the fusible link unit of the first embodiment.
Figure 6B:
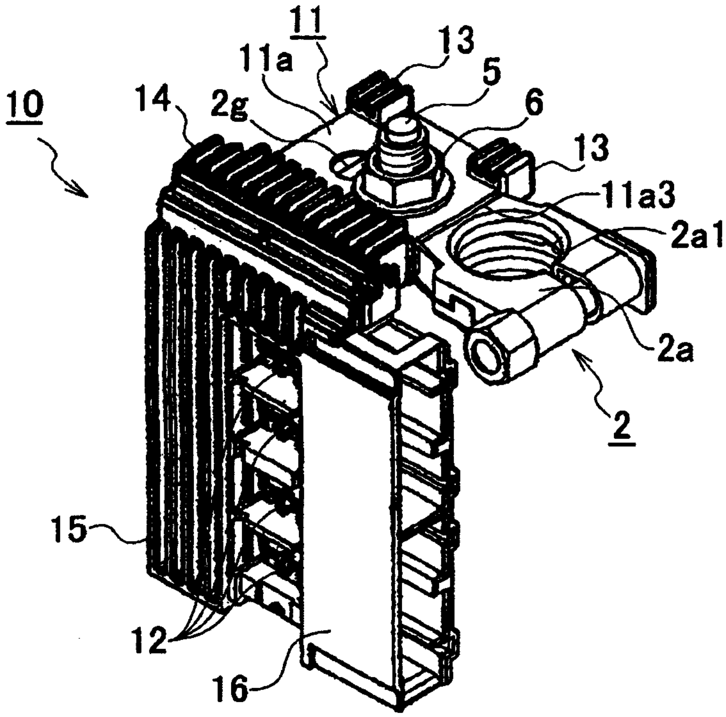
Figure 6C:
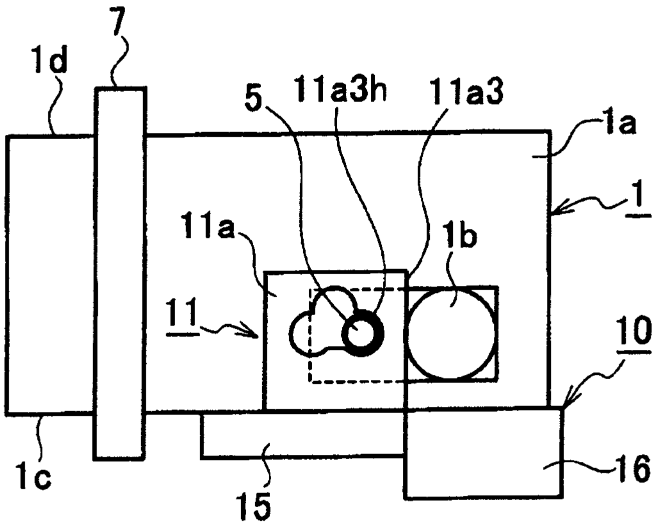

FIGS. 1A and 1B are explanatory views of the first embodiment of the fusible link unit of the invention. FIG. 1A is an exploded perspective view showing a condition in which the fusible link unit of the first embodiment is to be mounted on a battery post of an on-vehicle battery through a battery post-clamping terminal member. FIG. 1B is a perspective view of the fusible link unit of the first embodiment as seen from the reverse side thereof. FIGS. 2A, 2B and 2C are a left side-elevational view, a top plan view and a right side-elevational view of the battery post-clamping terminal member of FIG. 1, respectively. FIG. 3 is a developed view of an electrically-conductive bus bar employed in the fusible link unit of the first embodiment. FIGS. 4A, 4B and 4C are explanatory views of a first form of use of the fusible link unit of the first embodiment. FIG. 4A is a plan view showing the first form of use of a battery terminal of the bus bar. FIG. 4B is a perspective view showing the first form of use. FIG. 4C is a schematic view showing the first form of use in which the fusible link unit is mounted on the on-vehicle battery. FIGS. 5A, 5B and 5C are explanatory views of a second form of use of the fusible link unit of the first embodiment. FIG. 5A is a plan view showing the second form of use of the battery terminal of the bus bar. FIG. 5B is a perspective view showing the second form of use. FIG. 5C is a schematic view showing the second form of use in which the fusible link unit is mounted on the on-vehicle battery. FIGS. 6A, 6B and 6C are explanatory views of a third form of use of the fusible link unit of the first embodiment. FIG. 6A is a plan view showing the third form of use of the battery terminal of the bus bar. FIG. 6B is a perspective view showing the third form of use. FIG. 6C is a schematic view showing the third form of use in which the fusible link unit is mounted on the on-vehicle battery.

As shown in FIGS. 1A and 1B, the fusible link unit 10 of the first embodiment includes a battery terminal 11*a* and at least one fusible portion 12 so as to form a bus bar 11. The battery terminal 11*a* is combined with a battery post-clamp terminal member 2 which is clamped to a battery post 1*b* of a on-vehicle battery 1. The battery terminal 11*a* is formed at one end side of a conductive metal plate having a L-shape. The fusible portion 12 is fused when an over current flows on another end side of the L-shape. The bas bar 11 is able to be commonly used for a plurality kinds of vehicles, since the battery post-clamp terminal member 2 is selectively combined with the battery terminal 11*a* of the bus bar 11 from different directions.

Namely, in the first embodiment, a pair of battery posts 1*b* (only one of which is shown in FIG. 1A) indicated respectively as a plus electrode (positive electrode) and a minus electrode (negative electrode) by a red mark and a black mark) are formed in an exposed manner on an upper surface 1*a* of the on-vehicle battery 1. Each of the battery posts 1*b* formed in a rod made of electrically-conductive metal such as copper. In a power circuit of an electrical system (not shown) provided within an automobile, an electric current of several tens of amperes flows between a plus electrode (positive electrode) and a minus electrode (positive electrode), and the fusible link unit 10 of the first embodiment is mounted, for example, on the plus (positive) battery post 1*b* through the battery post-clamping terminal member 2 of which has electrical conductivity so as to protect the power circuit of the electrical system when an over-current flows. This embodiment is described below.

The battery post-clamping terminal member 2 is similar construction to the battery post-clamping terminal 102 of the related fusible link unit described above. The battery post-clamping terminal member 2 having electrical conductivity is formed by bending an conductive metal plate into a substantially recumbent U-shape as shown in FIGS. 2A to 2C. The battery post clamping terminal member 2 has a round clamp hole 2*a*1 on an one side 2*a* so as to penetrate the metal plate. The battery post 1*b* is inserted into and clamped by the round clamp hole 2*a*1. A groove 2*c* is formed by narrowly cutting out the metal plate from a part of the round clamp hole 2*a*1 to a portion between U-shape bending portions 2*b* and 2*d*.

An adjusting screw 3 is received in the pair of U-shaped bent portions 2*b* and 2*d* of the battery post-clamping terminal member 2. A nut 4 is screwed in a distal end portion of the adjusting screw 3. By tightening the adjusting screw 3 by the nut 4, the diameter of the clamp hole 2*a*1 is varied, thereby the clamp hole 2*a*1 clamps the terminal member 2 to the battery post 1*b* of the on-vehicle battery 1. A stud bolt 5, to which the fusible link unit 10 of the first embodiment is adapted to be fastened, is formed upright on the other end portion 2*e* of the terminal member 2. The other end portion 2*e* is formed into a flat plate-shape so as to be disposed substantially parallel to the upper surface 1*a* of the on-vehicle battery 1. The stud bolt 5 is provided at a position spaced in a predetermined distance from the center of the clamp hole 2*a*1. A nut 6 (FIG. 1) can be screwed to the stud bolt 5.

In this first embodiment, although the stud bolt 5 formed upright on the other end portion 2*e* of the battery post-clamping terminal member 2 is used as a fastening member for fastening the fusible link unit 10, the fastening means is not limited to this construction. For example, a screw hole (not shown) can be formed in the other end portion 2*e* of the battery post-clamping terminal member 2, into which a screw (not shown) serving as a fastening member for the fusible link unit 10 is screwed.

As shown in FIGS. 2A, 2B, and 2C, a rotation prevention portion 2*ab* for preventing the rotation of a polygonal head 3*a* of the adjusting screw 3 are formed respectively at left edges of the one end portion 2*a* of the battery post-clamping terminal member 2, and are disposed adjacent to the bent portion 2*b*. Similarly, a rotation prevention portion 2*ad* are formed respectively at right edges of the one end portion 2*a* of the battery post-clamping terminal member 2, and are disposed adjacent to the bent portion 2*d*. The adjusting screw 3 is able to be inserted into the pair of bent portions 2*b* and 2*d* from either of the left and right sides.

As shown in FIG. 2, a step portion 2*f* is formed between the one end portion 2*a* and the other end portion 2*e* of the battery post-clamping terminal member 2, and therefore the battery terminal 11*a* formed at the bus bar 11 is brought into abutting engagement with the step portion 2*f*, and by doing so, the direction of mounting of the battery terminal 11*a* on the other end portion 2*e* of the battery post-clamping terminal member 2 is able to be determined.

As described above, the battery post-clamping terminal member 2 is formed by bending the electrically-conductive metal plate into the generally recumbent U-shape, and by doing so, the cost of this terminal member 2 is lowered. However, the terminal member 2 is not limited to such a construction, and a battery post-clamping terminal member having similar functions is able to be formed, using a die cast material or the like.

The fusible link unit 10 of the first embodiment is designed to be fastened to the battery post-clamping terminal member 2 directly connected to the battery post 1*b* of the on-vehicle battery 1. This fusible link unit 10 includes the bus bar 11 which is formed by cutting an electrically-conductive metal plate into a predetermined shape by the use of a pressing machine and then by bending the thus cut metal plate into an L-shape by the use of a bending machine.

As shown in FIGS. 1A, 1B and 3, this bus bar 11 made of the electrically-conductive metal plate has the battery terminal 11*a* formed at one end portion the bus bar. The battery terminal 11*a* is flat so as to be disposed generally parallel to the upper surface 1*a* of the on-vehicle battery 1. The bus bar 11 is bent into the L-shape such that the other end portion 19 of the bus bar 11 disposed rearwardly of the battery terminal 11*a* vertically extends (or hangs down) so as to substantially be perpendicular to the battery terminal 11*a*, and thereafter one ends of the plurality of fusible portions 12 each having a fuse function are connected to the other end portion 19 of the bus bar 11.

In this bus bar 11, a chip made of alloy of tin, lead or other substance is used as each of the fusible portions 12 having the fuse function. When an over-current flows through any of these fusible portions 12, at least one of these fusible portions 12 melt because of self-heating.

Here, the battery terminal 11*a* formed at the one end portion of the bus bar 11 has at least two mounting edges (three mounting edges in the illustrated embodiment) which are formed at the outer periphery of the battery terminal 11*a*. These mounting edges are disposed substantially perpendicularly to each other so that the battery post-clamping terminal member 2 is able to be fastened to the battery terminal 1*a* from a selected one of different directions. More specifically, the battery terminal 11*a* has the distal end mounting edge 11*a*1, the left side mounting edge 11*a*2 and the right side mounting edge 11*a*3 which jointly form the rectangular peripheral edge of the battery terminal 11*a*.

Each of the mounting edges 11*a*1, 11*a*2 and 11*a*3 are able to be selectively fastened to the battery post-clamping terminal member 2. When the selected mounting edge is fastened, the selected mounting edge is perpendicular to an imaginary centerline O connecting the center of the clamp hole 2*a*1 and the center of the stud bolt 5 of the battery post-clamping terminal member 2. When fastening the battery terminal 11*a* to the battery post-clamping terminal member 2, a selected one of the three mounting edges 11*a*1, 11*a*2 and 11*a*3 of the battery terminal 11*a* is brought into abutting engagement with the above-mentioned step portion 2*f* (FIG. 2) of the battery post-clamping terminal member 2.

Three fastening holes (hole portions or fastening member-receiving portions) 11*a*1*h*, 11*a*2*h* and 11*a*3*h* are formed through the battery terminal 11*a*, and are opposed respectively to the three mounting edges 11*a*1, 11*a*2 and 11*a*3, and are continuous with each other to jointly assume a substantially trefoil-shape (threefold leaf-shape). The stud bolt 5 of the battery post-clamping terminal member 2 is inserted into a selected one of the three fastening holes 11*a*1*h*, 11*a*2*h* and 11*a*3*h* from the back surface of the terminal member 2, and the battery terminal 11*a* is fastened onto the battery post-clamping terminal member 2 by screwing the nut 6 on the stud bolt 5.

The (shortest) distance L1 between the center of the mounting edge 11*a*1 of the battery terminal 11*a* and the center of the fastening hole 11*a*1*h*, the (shortest) distance L2 between the center of the mounting edge 11*a*2 and the center of the fastening hole 11*a*2*h* and the (shortest) distance L3 between the center of the mounting edge 11*a*3 and the center of the fastening hole 11*a*3*h* are set so as to be substantially equal to each other as shown in FIG. 3.

With the above construction, the battery post-clamping terminal member 2 is selectively located so as to be opposed to any of the three mounting edges 11*a*1, 11*a*2 and 11*a*3 of the battery terminal 11*a*. Therefore the bus bar 11 is able to be used in any of the plurality of kinds of vehicles, and the fusible link unit 10 of the first embodiment is able to be provided at a low cost.

Referring back to FIGS. 1A and 1B, a pair of first resin-made position regulation members 13 each in the form of a square block are formed respectively at a corner portion of the battery terminal 11*a* (of the bus bar 1) where the distal end mounting edge 11*a*1 and the left side mounting edge 11*a*2 intersect each other and a corner portion of the battery terminal 11*a* where the distal end mounting edge 11*a*1 and the right side mounting edge 11*a*3 intersect each other. Each first resin-made position regulation member 13 is disposed over the opposite sides (faces) of the battery terminal 11*a*. Further, a second resin-made position regulation member 14 in the form of a rectangular block is formed on and along a rear portion of the battery terminal 11*a* disposed in parallel spaced relation to the distal end mounting edge 11*a*1, the second resin-made position regulation member 14 being disposed over the opposite sides of the battery terminal 11*a*.

With this construction, when the battery post-clamping terminal member 2 is inserted from the back side of the battery terminal 11*a* so as to be opposed to the distal end mounting edge 11*a*1, the other end portion 2*e* of the battery post-clamping terminal member 2 is positively positioned relative to the battery terminal 11*a* between the pair of first resin-made position regulation members 13 and 13 in a direction lateral to the inserting direction. Also, when the battery post-clamping terminal member 2 is inserted from the back side of the battery terminal 11*a* so as to be opposed to the left side mounting edge 11*a*2 or the right side mounting edge 11*a*3, the other end portion 2*e* of the battery post-clamping terminal member 2 is positively positioned relative to the battery terminal 11*a* between one or the other first resin-made position regulation member 13 and the second resin-made position regulation member 14 in the direction lateral to the inserting direction.

The rear portion of the L-shaped bus bar 11 (including the other end portion thereof) disposed perpendicularly to the battery terminal 11*a* is covered at its front and back sides (faces) with a resin-made case 15 except for the portion where the plurality of fusible portions 12 are positioned. The resin-made case 15 is made of an insulative resin and has radiating fins. A connector housing 16 is formed at the other end portion of the bus bar 11, and accommodates the other end portions of the plurality of fusible portions 12.

When covering the front and back sides of the bus bar 11 with the resin-made case 15 having the radiating fins, this resin-made case 15 and the first and second resin-made position regulation members 13 and 14 are integrally molded on the bus bar 11 at the same time.

As shown in FIG. 3, the second ends of the plurality of fusible portions 12 are connected respectively to a plurality of load terminals 17 and a plurality of alternator terminals 18, and these terminals 17 and 18 are accommodated within the connector housing 16. Therefore, a connector (not shown) connected to the electrical system is equipped in the connector housing 16.

When the fusible link unit 10 of the first embodiment having the above construction is to be fastened to the battery post-clamping terminal member 2 clamped to the battery post 1*b* of the on-vehicle battery 1, the fusible link unit 10 is able to take any of the first to third forms of use shown respectively in FIGS. 4 to 6.

Firstly, in the first form of use of the fusible link unit 10, as shown in FIGS. 4A to 4C, the stud bolt 5 formed upright on the other end portion 2*e* of the battery post-clamping terminal member 2 is inserted into the fastening hole 11*a*1*h* (formed through the battery terminal 11*a* of the bus bar 11 so as to be opposed to the distal end mounting edge 11*a*1) from the back side of the battery terminal 11*a*, and then the nut 6 is screwed onto the stud bolt 5, so that the battery post-clamping terminal member 2 is fastened to the distal end mounting edge 11*a*1 of the battery terminal 11*a*. Therefore, the clamp hole 2*a*1 formed through the one end portion 2*a* of the battery post-clamping terminal member 2 is opposed to the distal end mounting edge 11*a*1 of the battery terminal 11*a*, and in this condition the clamp hole portion 2*a*1 is clamped to the battery post 1*b* projecting upwardly from the upper surface 1*a* of the on-vehicle battery 1.

In this case, as shown in FIG. 4C, the fusible link unit 10 is electrically connected to the battery post 1*b* of the on-vehicle battery 1 through the battery post-clamping terminal member 2 without interfering with a battery band 7 extending between opposite side surfaces 1*c* and 1*d* of the on-vehicle battery 1 The resin-made case 15 (having the radiating fins) and the connector housing 16 which are provided on the fusible link unit 10 are disposed in substantially-parallel and slightly-spaced from the side surface 1*c* of the on-vehicle battery 1 in a cantilever manner (that is, in a hanging manner).

Next, in the second form of use of the fusible link unit 10, as shown in FIGS. 5A to 5C, the stud bolt 5 formed upright on the other end portion 2*e* of the battery post-clamping terminal member 2 is inserted into the fastening hole 11*a*2*h* (formed through the battery terminal 11*a* of the bus bar 11 so as to be opposed to the left side mounting edge 11*a*2) from the back side of the battery terminal 11*a*, and then the nut 6 is screwed onto the stud bolt 5, so that the battery post-clamping terminal member 2 is fastened to the left side mounting edge 11*a*2 of the battery terminal 11*a*. Therefore, the clamp hole 2*a*1 formed through the one end portion 2*a* of the battery post-clamping terminal member 2 is opposed to the left side mounting edge 11*a*2 of the battery terminal 11*a*, and in this condition the clamp hole portion 2*a*1 is clamped to the battery post 1*b* projecting upwardly from the upper surface 1*a* of the on-vehicle battery 1.

In this case, as shown in FIG. 5C, the fusible link unit 10 is electrically connected to the battery post 1*b* of the on-vehicle battery 1 through the battery post-clamping terminal member 2 without interfering with a battery band 7 extending between opposite side surfaces 1*c* and 1*d* of the on-vehicle battery 1, and also the resin-made case 15 (having the radiating fins) and the connector housing 16 which are provided on the fusible link unit 10 are disposed in substantially-parallel, adjacent (or contiguous) relation to the side surface 1*c* of the on-vehicle battery 1 in a cantilever manner (that is, in a hanging manner). Therefore, the area for installation of the fusible link unit 10 on the on-vehicle battery 1 is smaller as compared with the first form of use shown in FIGS. 4A to 4C.

Next, in the third form of use of the fusible link unit 10, as shown in FIGS. 6A to 6C, the stud bolt 5 formed upright on the other end portion 2*e* of the battery post-clamping terminal member 2 is inserted into the fastening hole 11*a*3*h* (formed through the battery terminal 11*a* of the bus bar 11 so as to be opposed to the right side mounting edge 11*a*3) from the reverse side of the battery terminal 11*a*, and then the nut 6 is screwed onto the stud bolt 5, so that the battery post-clamping terminal member 2 is fastened to the right side mounting edge 11*a*3 of the battery terminal 11*a*. Therefore, the clamp hole 2*a*1 formed through the one end portion 2*a* of the battery post-clamping terminal member 2 is opposed to the right side mounting edge 11*a*3 of the battery terminal 11*a*, and in this condition the clamp hole portion 2*a*1 is clamped to the battery post 1*b* projecting upwardly from the upper surface 1*a* of the on-vehicle battery 1.

In this case, as shown in FIG. 6C, the fusible link unit 10 is electrically connected to the battery post 1*b* of the on-vehicle battery 1 through the battery post-clamping terminal member 2 without interfering with a battery band 7 extending between opposite side surfaces 1*c* and 1*d* of the on-vehicle battery 1. The resin-made case 15 (having the radiating fins) and the connector housing 16 which are provided on the fusible link unit 10 are disposed in substantially-parallel, adjacent (or contiguous) relation to the side surface 1*c* of the on-vehicle battery 1 in a cantilever manner (that is, in a hanging manner). Therefore, the area for installation of the fusible link unit 10 on the on-vehicle battery 1 is smaller as compared with the first form of use shown in FIGS. 4A to 4C.

Then, when the fusible link unit 10 is operated in any of the first to third forms of use, electric power is supplied from the on-vehicle battery 1 and an alternator (not shown) and is distributed to the plurality of loads via the fuse circuit including the plurality of fusible portions 12 each performing the fuse function in the fusible link unit 10.

When a battery level of the on-vehicle battery 1 decreases, electric power is supplied from the alternator to the on-vehicle battery 1 to charge this battery. When a current larger than a predetermined value flows through any of the fusible portions 12 as a result of an accident such as short-circuiting of the load, it melts by heating. Thereby, the fusible portions prevent an accident due to the over-current same as the conventional fusible link unit.

Next, modified examples of the fusible link unit 10 of the first embodiment will be briefly described with reference to FIGS. 7A to 7E.

FIGS. 7A to 7E are views respectively showing 1st to 5th modified battery terminals of the bus bar used in the modified examples of the fusible link unit 10 of the first embodiment.

The 1st to 5th modified examples shown respectively in FIGS. 7A to 7E differ from the first embodiment only in the shape of fastening holes formed through the battery terminal 11*a* for the purpose of fastening the battery post-clamping terminal member 2 to the battery terminal 11*a*. Therefore, only the shapes of the fastening holes is described below.

Figure 7A:
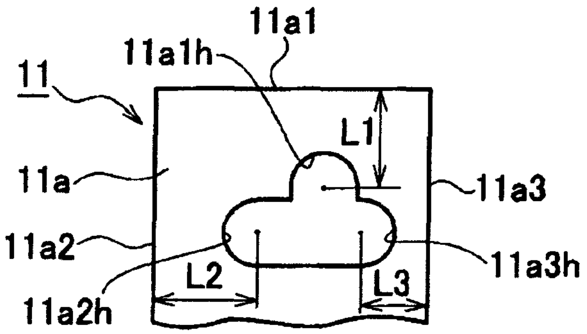
FIGS. 7A to 7E are views respectively showing 1st to 5th modified examples of the battery terminal of the bus bar in the fusible link unit of the first embodiment.

In the 1st modified example shown in FIG. 7A, the battery post-clamping terminal member 2 is able to be fastened selectively to any of a distal end mounting edge 11*a*1, a left side mounting edge 11*a*2 and a right side mounting edge 11*a*3 of the battery terminal 11*a*. In this case, three fastening holes 11*a*1*h*, 11*a*2*h* and 11*a*3*h* are formed through the battery terminal 11*a* in opposed relation respectively to the mounting edges 11*a*1, 11*a*2 and 11*a*3, and are continuous with each other to assume a substantially trefoil-shape. The (shortest) distance L1 between the mounting edge Hal of the battery terminal 11*a* and the center of the fastening hole 11*a*1*h*, the (shortest) distance L2 between the mounting edge 11*a*2 and the center of the fastening hole 11*a*2*h* and the (shortest) distance L3 between the mounting edge 11*a*3 and the center of the fastening hole 11*a*3*h* are different from one another. Alternatively, at least one of the shortest distances L1, L2 and L3 is different from the other shortest distances. With this construction, the bus bar 11 is able to be used for any of a plurality of kinds of vehicles, and the first modified fusible link unit is provided at a low cost.

Figure 7B:
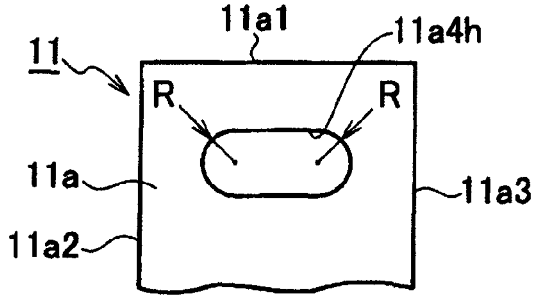

In the 2nd modified example shown in FIG. 7B, the battery post-clamping terminal member 2 is able to be fastened selectively to any of a distal end mounting edge 11*a*1, a left side mounting edge 11*a*2 and a right side mounting edge 11*a*3 of the battery terminal 11*a*. In this case, the slot-like fastening hole 11*a*4*h* whose semi-circular opposite end edges have the same radius R is formed through the battery terminal 11*a*, and extends parallel to the distal end mounting edge 11*a*1 or (the left and right mounting edges 11*a*2 and 11*a*3). With this construction, the bus bar 11 is able to be used for any of a plurality of kinds of vehicles, and the second modified fusible link unit is provided at a low cost.

Figure 7C:
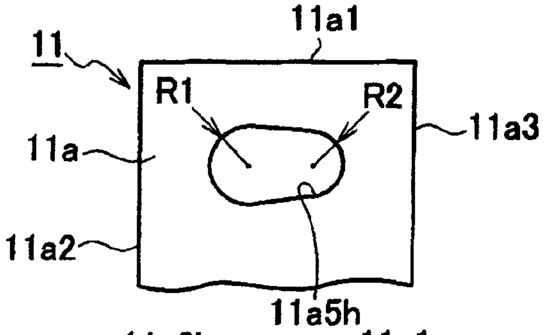

In the 3rd modified example shown in FIG. 7C, the battery post-clamping terminal member 2 is able to be fastened selectively to any of a distal end mounting edge 11*a*1, a left side mounting edge 11*a*2 and a right side mounting edge 11*a*3 of the battery terminal 11*a*. In this case, the slot-like fastening hole 11*a*5*h* whose semi-circular opposite end edges have different radiuses R1 and R2, respectively, is formed through the battery terminal 11*a*, and extend generally parallel to the distal end mounting edge 11*a*1 (or the left and right side mounting edges 11*a*2 and 11*a*3). With this construction, the bus bar 11 is able to be used for any of a plurality of kinds of vehicles, and the 3rd modified fusible link unit can be provided at a low cost.

Figure 7D:
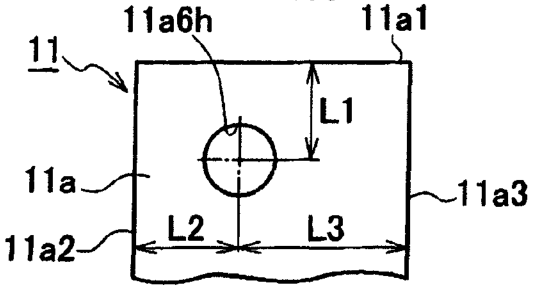

In the 4th modified example shown in FIG. 7D, the battery post-clamping terminal member 2 is able to be fastened selectively to any of a distal end mounting edge 11*a*1, a left side mounting edge 11*a*2 and a right side mounting edge 11*a*3 of the battery terminal 11*a*. In this case, one fastening hole 11*a*6*h* of a round shape is formed through the battery terminal 11*a*, and the (shortest) distance L1 between the mounting edge 11*a*1 of the battery terminal 11*a* and the center of the fastening hole 11*a*6*h*, the (shortest) distance L2 between the mounting edge 11*a*2 and the center of the fastening hole 11*a*6*h* and the (shortest) distance L3 between the mounting edge 11*a*3 and the center of the fastening hole 11*a*6*h* are different from one another. Alternatively, at least one of the shortest distances L1, L2 and L3 is different from the other shortest distances. With this construction, the bus bar 11 is able to be used for any of a plurality of kinds of vehicles, and the 4th modified fusible link unit is provided at a low cost.

Figure 7E:
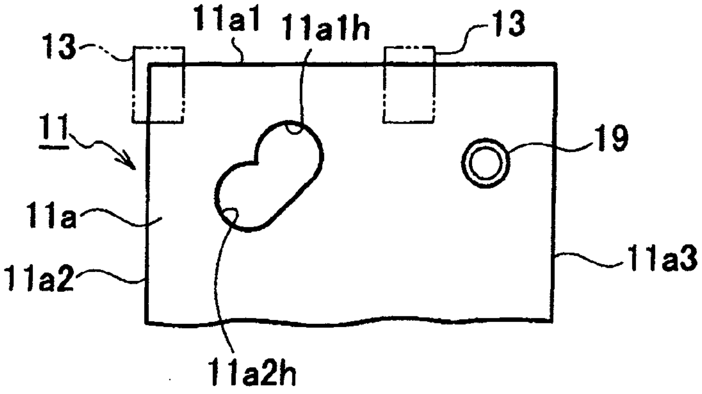

In the 5th modified example shown in FIG. 7E, for example, a stud bolt 19 is fixedly secured to a right side portion of the battery terminal 11*a* of the bus bar 11. In this case, the battery post-clamping terminal member 2 is able to be fastened to either of a distal end mounting edge 11*a*1 and a left side mounting edge 11*a*2 of the battery terminal 11, and therefore two fastening holes 11*a*1*h* and 11*a*2*h* are formed through the battery terminal 11*a*, and are opposed respectively to the two mounting edges 11*a*1 and 11*a*2, and are continuous with each other to jointly assume a substantially twofold leaf-shape. With this construction, the bus bar 11 is able to be used for any of a plurality of kinds of vehicles, and the 5th modified fusible link unit is provided at a low cost.

In the case of the 5th modified example, the first resin-made position regulation members 13 and 13 (for regulating the position of the battery post-clamping terminal member 2 when it is be fastened to the distal end mounting edge 11*a*1) are provided respectively at a left corner portion of the battery terminal 11*a* (where the distal end mounting edge 11*a*1 and the left side mounting edge 11*a*2 intersect each other) and a right portion of the distal end mounting edge 11*a*1.

In FIG. 7E, although the stud bolt 19 is fixedly secured to the right side portion of the battery terminal 11*a* of the bus bar 11, the stud bolt 19 may be fixedly secured to a left side portion of the battery terminal 11*a*. Also, it is possible that a fusible portion (not shown) is formed at the right side portion (or the left side portion) of the battery terminal 11*a*. In such a cases, the battery post-clamping terminal member 2 is able to be fastened selectively to either of at least two mounting edges of the battery terminal 11*a*.

Second Exemplary Embodiment

Figure 8:
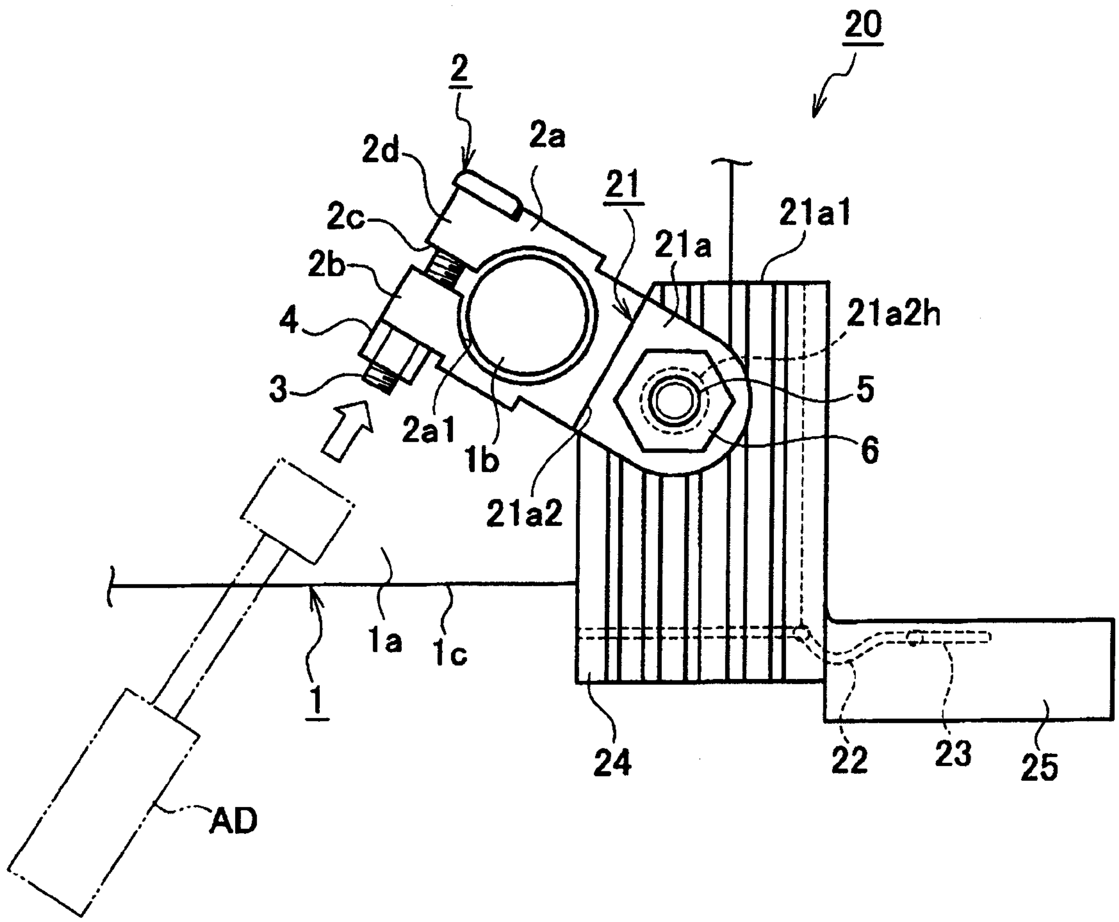
FIG. 8 is a plan view showing a condition in which a second embodiment of a fusible link unit of the invention is mounted on a battery post of an on-vehicle battery through a battery post-clamping terminal member.
Figure 9:
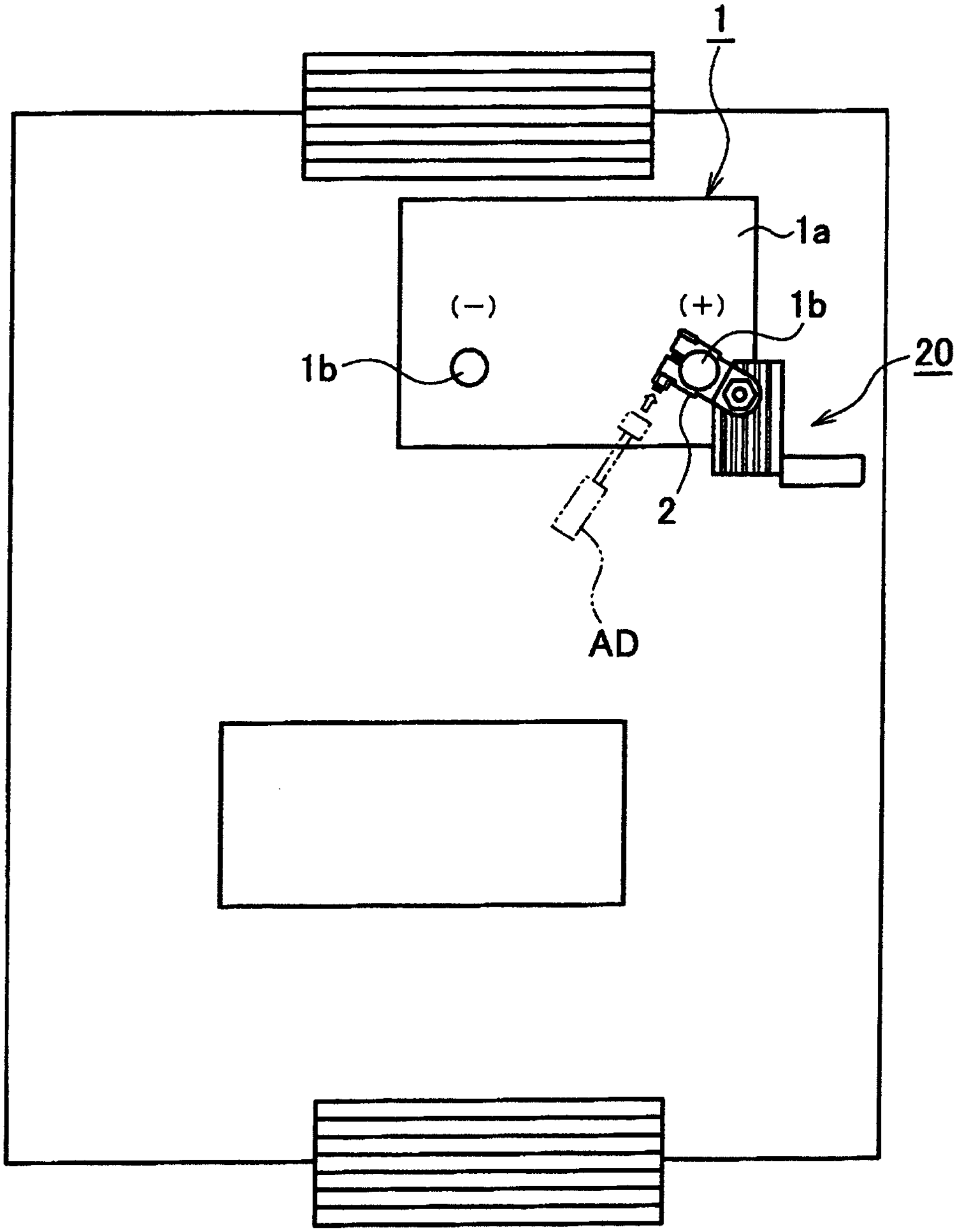
FIG. 9 is a plan view showing a condition in which the fusible link unit of the second embodiment is mounted on the battery post of the on-vehicle battery through the battery post-clamping terminal member when the on-vehicle battery is mounted within a trunk room of a vehicle.

FIG. 8 is a plan view showing a condition in which a second embodiment of a fusible link unit of the invention is mounted on a battery post of an on-vehicle battery through a battery post-clamping terminal member, and FIG. 9 is a plan view showing a condition in which the fusible link unit of the second embodiment is mounted on the battery post of the on-vehicle battery through the battery post-clamping terminal member when the on-vehicle battery is mounted within a trunk room of a vehicle.

As shown in FIG. 8, in the fusible link unit 20 of the second embodiment, a bus bar 21 including a battery terminal 21*a* and at least one fusible portion 22 so as to form a bus bar. The battery terminal 21*a* is fastened to a battery post-clump terminal member 2 which is clumped to a battery post 1*b* of a on-vehicle battery. The battery terminal 21*a* is formed at one end side of a conductive metal plate. The fusible portion 22 is fused when an over current flows on another end side which is rearward of the metal plate as compared to the battery terminal 21*a*. The bas bar 21 is able to be commonly used for a plurality kinds of vehicles. The fusible link unit 20 of the second embodiment enables user to efficiently mount the battery post clamp terminal member 2 for fastening the battery terminal 21*a* of bus bar 21 on the battery post 1*b* of the on-vehicle battery 1. Also, the fusible link unit 20 of the second embodiment makes it possible to reduce an area of installation of the fusible link unit 20 on the on-vehicle battery 1 as described hereafter.

Namely, in this second embodiment, a pair of battery posts 1*b* (see FIG. 9), indicated respectively as a plus electrode (positive electrode) and a minus electrode (negative electrode) by a red mark and a black mark), are formed in an exposed manner on an upper surface 1*a* of the on-vehicle battery 1 as described above for the first embodiment. Each of the battery posts 1*b* includes a rod made of electrically-conductive metal such as copper. The fusible link unit 20 of the second embodiment is mounted, for example, on the plus (positive) battery post 1*b* via the battery post-clamping terminal member 2 of an electrically-conductive nature.

The battery post-clamping terminal member 2 of the electrically-conductive nature is similar to the battery post-clamping terminal member 2 described above for the first embodiment, and therefore detailed explanation of it is omitted.

In the fusible link unit 20 of the second embodiment, also, the bus bar 21 is formed by cutting an electrically-conductive metal plate into a predetermined shape by the use of a pressing machine and then by bending the thus cut metal plate into an L-shape by the use of a bending machine.

This bus bar 21 made of the electrically-conductive metal plate has the battery terminal 21*a* formed at one end portion of the bus bar 21. The battery terminal 21*a* is flat so as to be disposed substantially parallel to the upper surface 1*a* of the on-vehicle battery 1. The bus bar 21 is bent into an L-shape such that the other end portion of the bus bar 21 disposed rearwardly of the battery terminal 21*a* extends so as to be substantially vertical to the battery terminal 21*a*. First ends of the plurality of fusible portions 22 each having a fuse function are connected to the other end portion of the bus bar 21. Load terminals 23 are connected respectively to the other ends of the fusible portions 22.

The bus bar 21 is covered at its opposite sides (faces) with a resin-made case 24 except for portions where the battery terminal 21*a* and the plurality of fusible portions 22 position. The resin-made case 25 is made of an insulative resin and has radiating fins. A connector housing 25 is formed at the other end portion of the bus bar 11, and accommodates the second end portions of the plurality of fusible portions 22.

In this second embodiment, the battery terminal 21*a* formed at the one end portion of the bus bar 21 includes an inclined mounting edge 21*a*2 extending from an end of the distal left end edge 21*a*1 so as to be inclined in a predetermined angle (for example 45 degrees) from a side surface 1*c* of the on-vehicle battery 1. The distal end edge 21*a*1 is substantially parallel to the side surface 1*c* of the on-vehicle battery 1. A fastening hole 21*a*2*h* of a round shape is formed through the battery terminal 21*a* so as to be opposed to the inclined mounting edge 21*a*2.

The other end portion of the battery post-clamping terminal member 2 is opposed to the inclined mounting edge 21*a*2 of the battery terminal 21*a*, and a stud bolt 5 formed upright on the other end portion 2*e* is inserted into the fastening hole 21*a*2*h* from the back side of the battery terminal 21*a*, and the battery post-clamping terminal member 2 is fastened to the battery terminal 21*a* by screwing a nut 6 onto the stud bolt 5.

The battery post-clamping terminal member 2 is able to be properly positioned relative to the battery terminal 21*a* in a direction lateral to the direction of inserting of the terminal member 2 because left and right portion of the inclined mounting edge 21*a*2 of the battery terminal 21*a* which is formed at one end portion of bas bar 21.

When the battery post-clamping terminal member 2 is fastened to the inclined mounting edge 21*a*2 of the battery terminal 21*a* of the bus bar 21, the resin-made case 24 (having the radiating fins) and the connector housing 25 which are provided on the fusible link unit 20 are disposed so as to be substantially parallel and adjacent to the side surface 1*c* of the on-vehicle battery 1 in a cantilever manner (that is, in a hanging manner). Therefore, the area of installation of the fusible link unit 20 on the on-vehicle battery 1 is reduced.

The on-vehicle battery 1 is mounted, for example, within the trunk room, and then the fusible link unit 20 is fastened to the battery post 1*b* of the on-vehicle battery 1 through the battery post-clamping terminal member 2 as shown in FIGS. 8 and 9. In this case, the battery post-clamping terminal member 2 is fastened to the battery terminal 21*a* and is disposed at substantially right angles relative to the inclined mounting edge 21*a*2 thereof. Therefore if an fastening operating position of the operator to is located at a rear portion of the vehicle, a pneumatically-operated screwdriver AD for tightening an adjusting screw 3 (received in U-shaped bent portions 2*b* and 2*d* of the battery post-clamping terminal member 2) by a nut 4 is directed toward the operator, and therefore the battery post-clamping terminal member 2 is able to be positively and efficiently clamped to the battery post 1*b* of the on-vehicle battery 1.

Third Exemplary Embodiment

Figure 10:
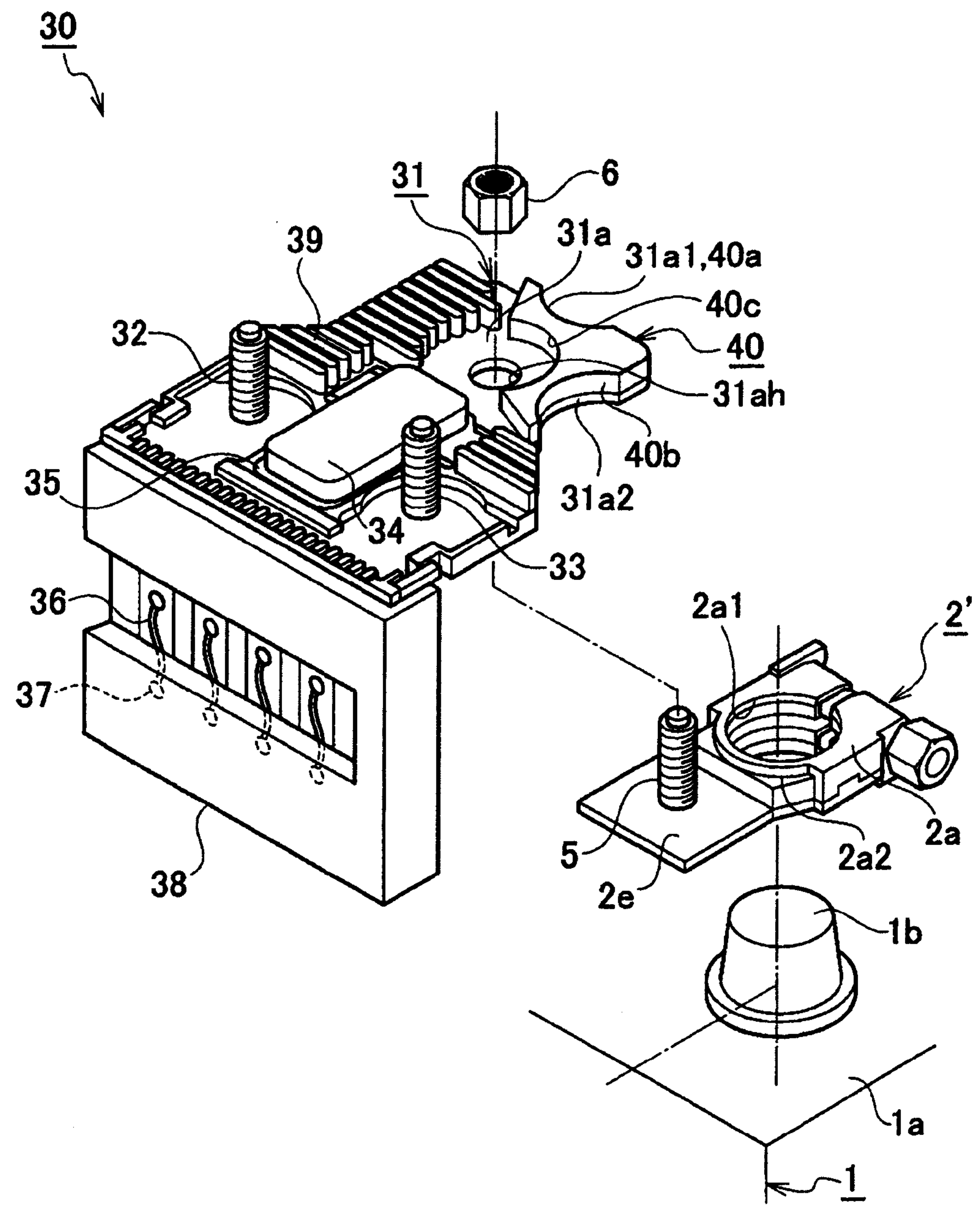
FIG. 10 is an exploded perspective view showing a condition in which a third embodiment of a fusible link unit of the invention is to be mounted on a battery post of an on-vehicle battery through a battery post-clamping terminal member.
Figure 11:
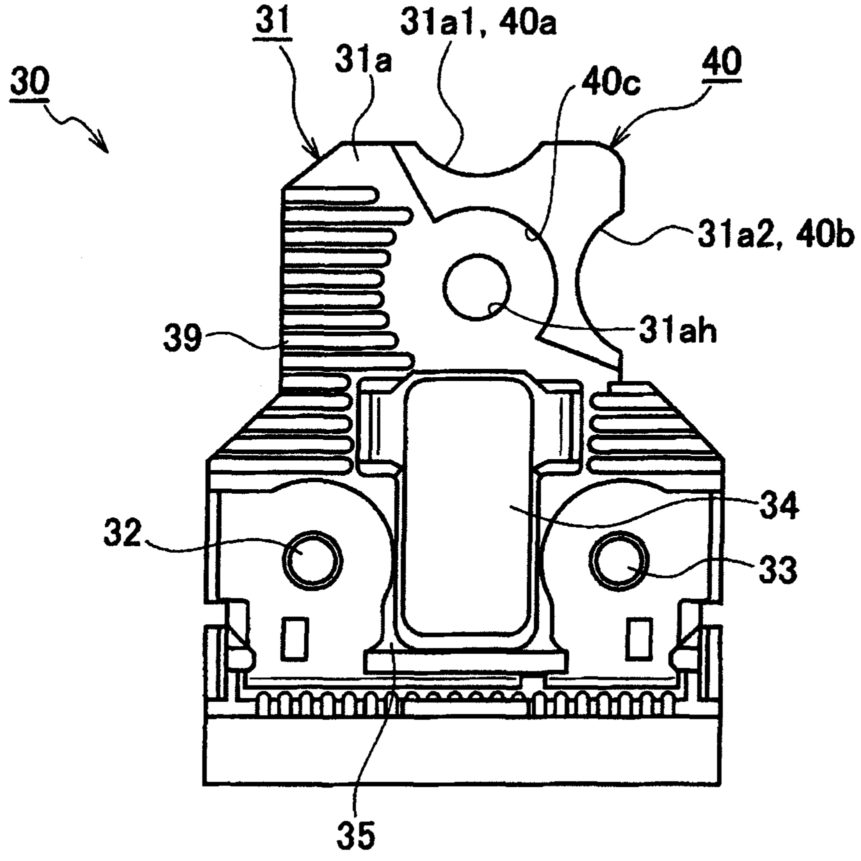
FIG. 11 is a plan view showing the fusible link unit of the third embodiment.
Figure 12B:
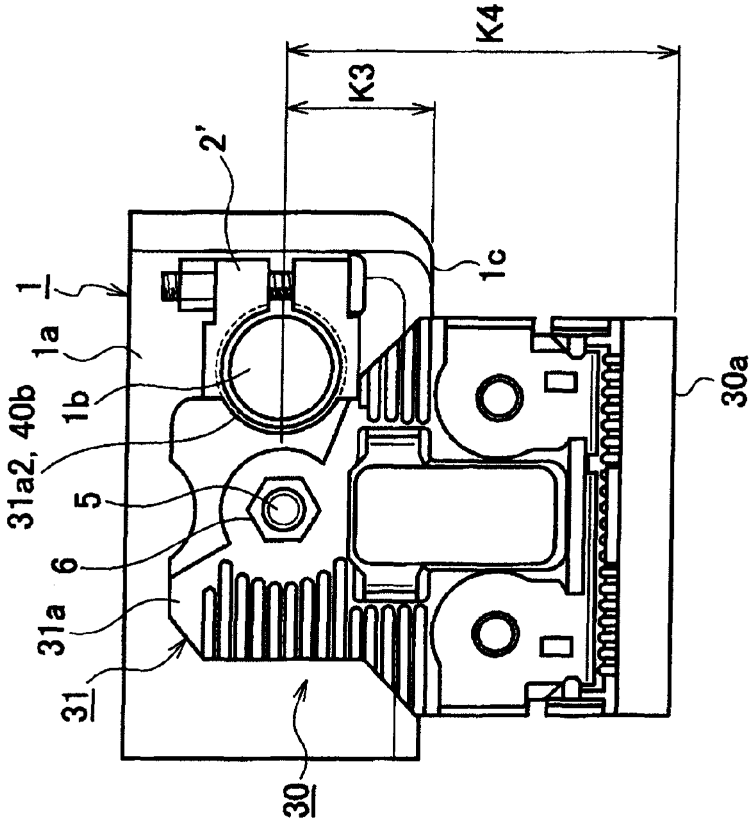
FIG. 12B is a view showing a second form of use, in which the fusible link unit of the third embodiment is mounted on the battery post of the on-vehicle battery through the battery post-clamping terminal member.
Figure 12A:
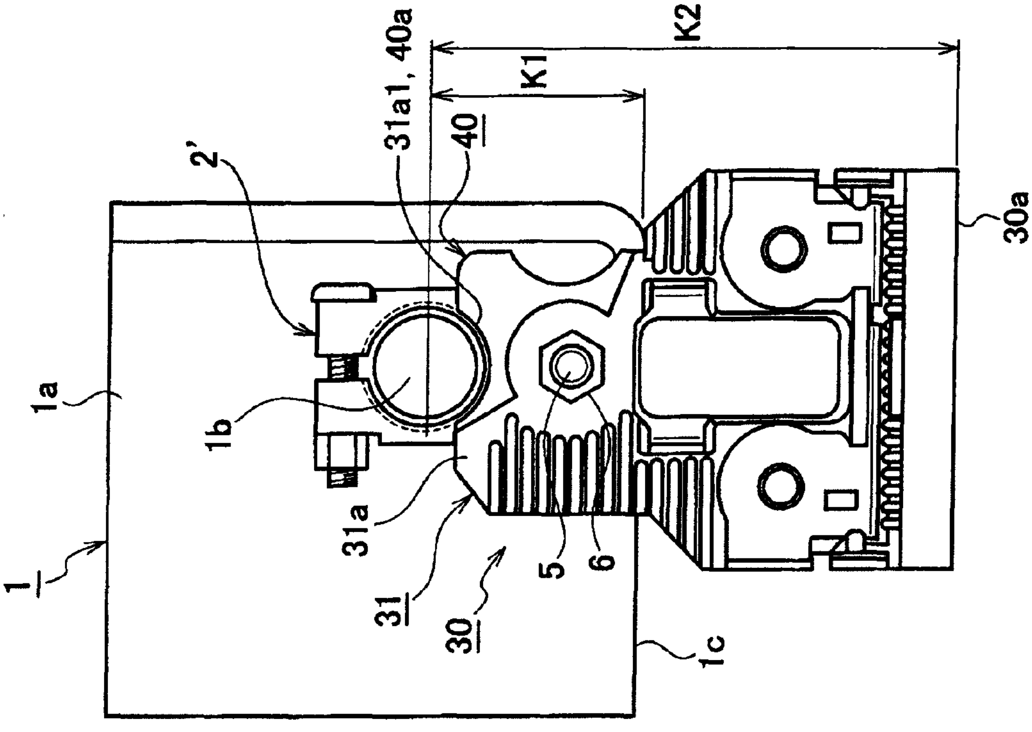
FIG. 12A is a view showing a first form of use, in which the fusible link unit of the third embodiment is mounted on the battery post of the on-vehicle battery through the battery post-clamping terminal member.
Figure 13:
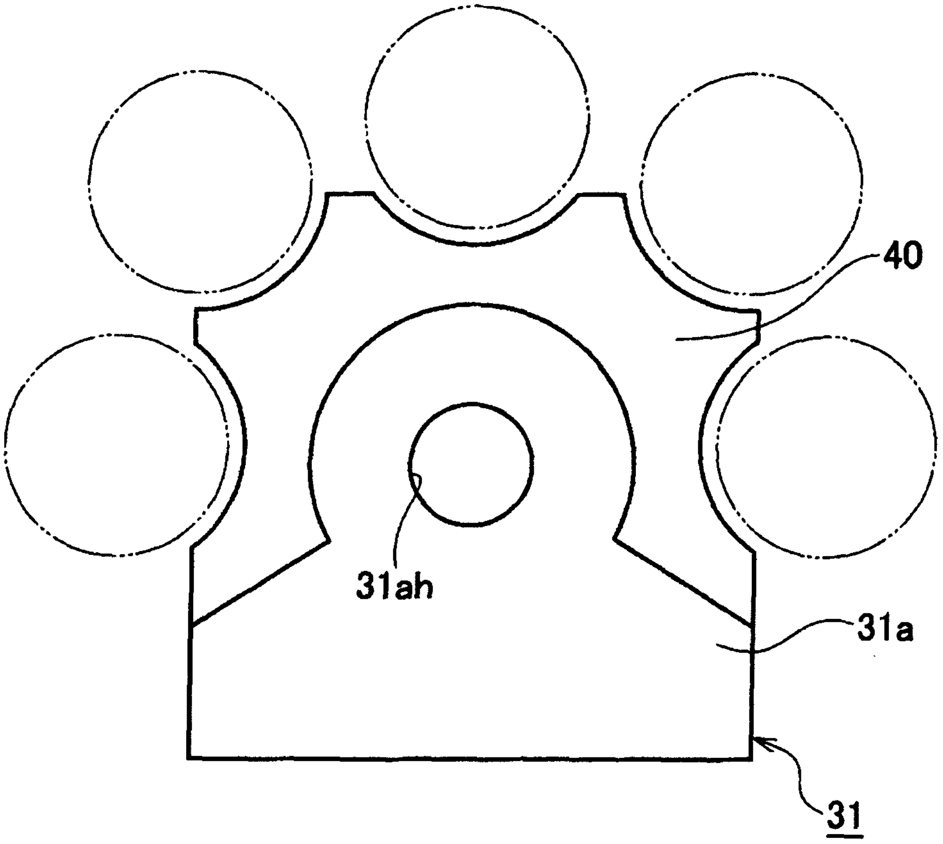
FIG. 13 is an enlarged plan view showing a battery terminal formed at one end portion of a bus bar employed in the fusible link unit of the third embodiment.
Figure 14:
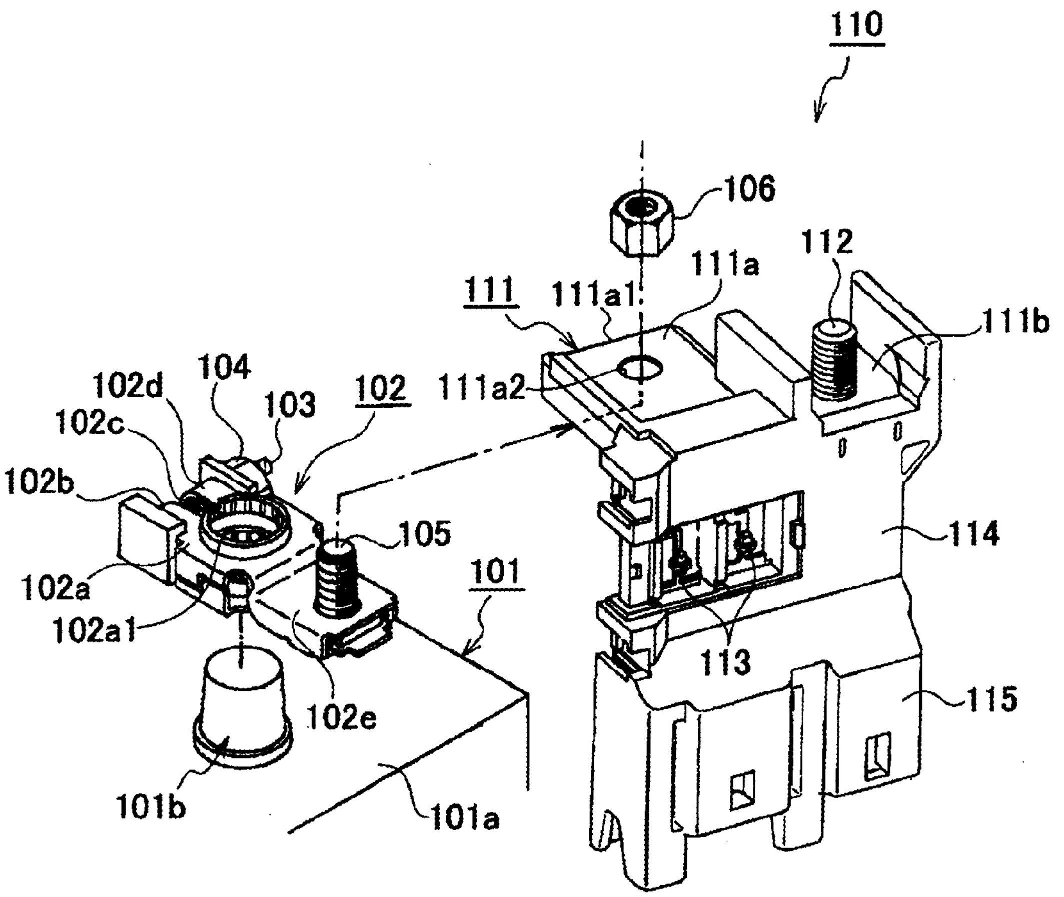
PRIOR ART FIG. 14
FIG. 14 is an exploded perspective view showing a condition in which a conventional fusible link unit is to be mounted on a battery post of an on-vehicle battery through a battery post-clamping terminal member.
Figure 15:
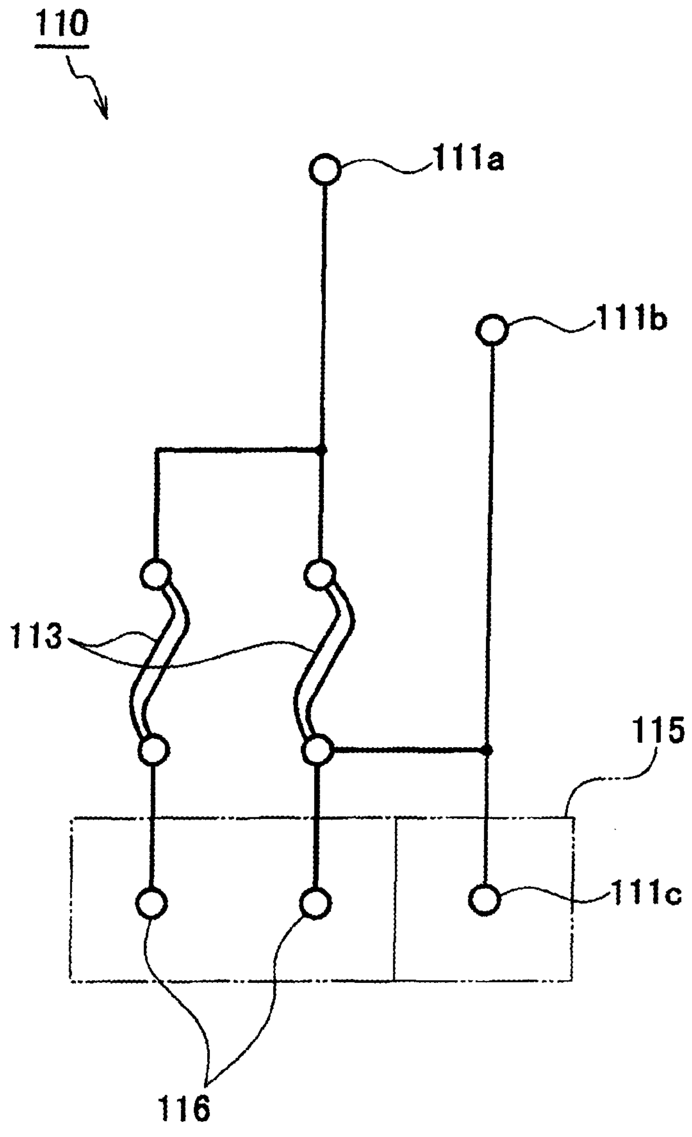
PRIOR ART FIG. 15
FIG. 15 is a circuit diagram of a fuse circuit in the conventional fusible link unit.

FIG. 10 is an exploded perspective view showing a condition in which a third embodiment of a fusible link unit of the invention is to be mounted on a battery post of an on-vehicle battery through a battery post-clamping terminal member, and FIG. 11 is a plan view showing the fusible link unit of the third embodiment, and FIG. 12A is a view showing a first form of use, in which the fusible link unit of the third embodiment is mounted on the battery post of the on-vehicle battery through the battery post-clamping terminal member, and FIG. 12B is a view showing a second form of use, in which the fusible link unit of the third embodiment is mounted on the battery post of the on-vehicle battery through the battery post-clamping terminal member, and FIG. 13 is an enlarged plan view showing a battery terminal formed at one end portion of a bus bar employed in the fusible link unit of the third embodiment.

As shown in FIG. 10, in the fusible link unit 30 of the third embodiment, the bus bar 31 is made of an electrically-conductive metal sheet, and has the battery terminal 31*a* formed at one end portion thereof and adapted to be clamped to the battery post-clamping terminal member 2' clamped to the battery post 1*b* of the on-vehicle battery 1, and the bus bar 31 is bent into an L-shape such that the other end portion of the bus bar 31 disposed rearwardly of the battery terminal 31*a* extends generally vertically perpendicularly to the battery terminal 31*a*, and at least one fusible portion 35 (a plurality of fusible portions 35 in the illustrated embodiment) which can melt upon flowing of an over-current therethrough is connected to the other end portion of the bus bar 31. The fusible link unit 30 is characterized in that at least two concavely-curved mounting edges (31*a*1 and 31*a*2) of a generally arc-shape are formed at the outer periphery of the battery terminal 31*a* of the bus bar 31, that a resin-made positioning member 40 having at least two concavely-curved surfaces (or edges) 40*a* and 40*b* equal in shape to the concavely-curved mounting edges 31*a*1 and 31*a*2 is fixedly secured to the battery terminal 31*a* such that the two concavely-curved surfaces 40*a* and 40*b* extend respectively along the two concavely-curved mounting edges 31*a*1 and 31*a*2, and that the battery post-clamping terminal member 2' can be positioned selectively relative to either of the two concavely-curved mounting edges 31*a*1 and 31*a*2 and can be fastened thereto.

Namely, in this third embodiment, a pair of battery posts 1*b* (only one of which is shown in the drawings) are formed in an exposed manner on an upper surface 1*a* of the on-vehicle battery 1 as described above for the first and second embodiments, each of the battery posts 1*b* comprising a rod made of electrically-conductive metal such as copper. The fusible link unit 30 of the third embodiment is mounted, for example, on the plus (positive) battery post 1*b* via the battery post-clamping terminal member 2' of an electrically-conductive nature.

As described above for the first embodiment, the battery post-clamping terminal member 2' of the electrically-conductive nature is formed by bending an electrically-conductive metal sheet into a recumbent U-shape, and a round clamp hole 2*a*1 for the passage of the battery post 1*b* of the on-vehicle battery 1 therethrough for clamping purposes is formed through one end portion 2*a* of the terminal member 2' in an upward-downward direction, and a stud bolt 5 is formed upright on the other end portion 2*e* of the terminal member 2' (formed into a flat plate-shape so as to be disposed generally parallel to the upper surface 1*a* of the on-vehicle battery 1), and is spaced a predetermined distance from the center of the clamp hole 2*a*1. A nut 6 can be threaded on the stud bolt 5. The battery post-clamping terminal member 2' of the third embodiment differs from the battery post-clamping terminal member 2 of the first embodiment in that a convexly-curved surface 2*a*2 is formed on part of an outer peripheral portion of the clamp hole 2*a*1 in concentric relation to this clamp hole 2*a*1.

In the third embodiment, also, the bus bar 31 is formed by cutting an electrically-conductive metal sheet into a predetermined shape by the use of a pressing machine and then by bending the thus cut metal sheet into an L-shape by the use of a bending machine.

The bus bar 31 made of the electrically-conductive metal sheet has the battery terminal 31*a* formed at the one end portion thereof, the battery terminal 11*a* being flat so as to be disposed generally parallel to the upper surface 1*a* of the on-vehicle battery 1. A pair of stud bolts 32 and 33 are fixed respectively to right and left sections of that portion of the bus bar 31 disposed rearwardly of the battery terminal 31*a*, and an IC 34 is mounted through a socket 35 on that portion of the bus bar 31 lying between the pair of stud bolts 32 and 33. The bus bar 31 is bent into an L-shape such that the other end portion of the bus bar 31 disposed rearwardly of the pair of stud bolts 32 and 33 and the IC 34 extends generally vertically perpendicularly to the battery terminal 31*a*, and thereafter one ends of the plurality of fusible portions 36 each having a fuse function are connected to the other end portion of the bus bar 31 while the other ends of the fusible portions 36 are connected respectively to load terminals 37, and the load terminals 37 are received within a connector housing 38.

The bus bar 31 is covered at its opposite sides (faces) with a resin-made case 39 except the battery terminal 31*a*, those portions of the bus bar 31 disposed respectively around the pair of stud bolts 32 and 33 and the plurality of fusible portions 36, the resin-made case 39 being made of an insulative resin and having radiating fins.

In this third embodiment, as shown in FIG. 11 on an enlarged scale, the two concavely-curved mounting edges 31*a*1 and 31*a*2 of the arc-shape are formed at the outer periphery (or outer peripheral edge) of the battery terminal 31*a* formed at the one end portion of the bus bar 31, and more specifically are formed respectively at the distal end edge of the battery terminal 31*a* and the right side edge thereof perpendicularly intersecting this distal end edge. Each of the two concavely-curved mounting edges 31*a*1 and 31*a*2 has a curvature substantially corresponding to a curvature of the convexly-curved surface 2*a*2 formed on the outer peripheral portion of the clamp hole 2*a*1. A fastening hole 31*ah* of a round shape is formed through the battery terminal 31*a* in opposed relation to the two concavely-curved mounting edges 31*a*1 and 31*a*2.

The resin-made positioning member 40 having a predetermined thickness is fixedly secured to the outer peripheral portion of the battery terminal 31*a* (formed at the one end portion of the bus bar 31) such that the outer periphery of this resin-made positioning member 40 substantially coincides with part of the outer periphery of the battery terminal 31 including the two concavely-curved mounting edges 31*a*1 and 31*a*2. The resin-made positioning member 40 have the concavely-curved surfaces (or edges) 40*a* and 40*b* which face outwardly, and are equal in shape and curvature to the concavely-curved mounting edges 30*a*1 and 30*a*2, and extend respectively along the concavely-curved mounting edges 30*a*1 and 30*a*2. The resin-made positioning member 40 further has a concavely-curved surface (or edge) 40*c*, and this concavely-curved surface 40*c* faces inwardly, and is disposed in concentric relation to the fastening holes 31*ah*, and is larger in diameter than the nut 6.

The convexly-curved surface 2*a*2 formed at the outer peripheral portion of the clamp hole 2*a*1 of the battery post-clamping terminal member 2' can abut in a positioned condition against each of the concavely-curved surfaces 40*a* and 40*b* of the resin-made positioning member 40 fixedly secured to the battery terminal 31*a* with the concavely-curved surfaces 40*a* and 40*b* extending respectively along the concavely-curved mounting edges 31*a*1 and 31*a*2. Therefore, the battery post-clamping terminal member 2' can be fastened selectively to either of the concavely-curved surfaces 40*a* and 40*b* of the resin-made positioning member 40.

As shown in FIG. 12A, when the fusible link unit 30 of the third embodiment is to be electrically connected to the battery post 1*b* (formed on the upper surface 1*a* of the on-vehicle battery 1) through the battery post-clamping terminal member 2', the battery post-clamping terminal member 2' clamped to the battery post 1*b* of the on-vehicle battery 1 is disposed in opposed relation to the concavely-curved (distal end) mounting edge 31*a*1 of the battery terminal 31*a* and the concavely-curved surface 40*a* of the resin-made positioning member 40, and then the stud bolt 5 formed upright on the other end portion 2*e* (FIG. 10) of the battery post-clamping terminal member 2' is inserted into the fastening hole 31*ah* from the reverse side of the battery terminal 31, and is tightened by the nut 6. By doing so, the distance K1 between the center of the battery post 1*b* and a side surface 1*c* of the on-vehicle battery 1 can be increased, and also the distance K2 between the center of the battery post 1*b* and a rear end 30*a* of the fusible link unit 30 can be increased.

On the other hand, as shown in FIG. 12B, when the fusible link unit 30 of the third embodiment is to be electrically connected to the battery post 1*b* (formed on the upper surface 1*a* of the on-vehicle battery 1) through the battery post-clamping terminal member 2', the battery post-clamping terminal member 2' clamped to the battery post 1*b* of the on-vehicle battery 1 is disposed in opposed relation to the concavely-curved (right) mounting edge 31*a*2 of the battery terminal 31*a* and the concavely-curved surface 40*b* of the resin-made positioning member 40, and then the stud bolt 5 formed upright on the other end portion 2*e* (FIG. 10) of the battery post-clamping terminal member 2' is inserted into the fastening hole 31*ah* from the reverse side of the battery terminal 31, and is tightened by the nut 6. By doing so, the distance K3 between the center of the battery post 1*b* and a side surface 1*c* of the on-vehicle battery 1 can be reduced, and also the distance K4 between the center of the battery post 1*b* and the rear end 30*a* of the fusible link unit 30 can be reduced.

In the fusible link unit 30 of the third embodiment, as described above, the concavely-curved mounting edges 31*a*1 and 31*a*2 are formed respectively at the distal end edge and right edge of the battery terminal 31*a* formed at the one end portion of the bus bar 31, and the concavely-curved surfaces 40*a* and 40*b* corresponding respectively to the two concavely-curved mounting edges 31*a*1 and 31*a*2 are formed at the resin-made positioning member 40. However, the invention is not limited to this construction, and there can be used a construction in which a plurality of concavely-curved mounting edges are formed respectively at a distal end edge, left and right edges and a left corner portion (where the distal end edge and the left edge intersect each other) and a right corner portion (where the right edge and the distal end edge intersect each other) of a battery terminal 31*a* formed at one end portion of a bus bar 31 as shown in FIG. 13, and a plurality of concavely-curved surfaces corresponding respectively to the plurality of concavely-curved mounting edges are formed at a resin-made positioning member 40. In this case, the battery post-clamping terminal 2' can be fastened selectively to any of the plurality of concavely-curved mounting edges (formed at the outer periphery of the battery terminal 31) and also to the corresponding one of the plurality of concavely-curved surfaces formed at the resin-made positioning member (conforming respectively to the plurality of concavely-curved mounting edges), using the fastening hole 31*ah* formed through the battery terminal 31*a*. Thus, the battery terminal 31*a* is required to have at least two concavely-curved mounting edges, and the resin-made positioning member is required to have at least two concavely-curved surfaces.

In the fusible link unit 30, the vertically-extending other end portion of the L-shaped bus bar 31 hangs down in adjacent relation to the outer side surface of the on-vehicle battery 1, and although a space available around the on-vehicle battery 1 varies depending on the kind of vehicle, the battery post-clamping terminal member 2' can be fastened to the battery terminal 31 (formed at the one end portion of the bus bar 31) from a suitable direction (that is, from any of the plurality of directions), and therefore the fusible link unit 30 of the third embodiment can be used in any of a plurality of kinds of vehicles.

In each of the above fusible link units 10, 20 and 30 of the first, second and third embodiments, the terminals 17 and 18, 23, 37 connected respectively to the other ends of the fusible portions 12, 22 and 36 are received within the connector housing 16, 25, 38. However, the invention is not limited to such a construction, and the other ends of the fusible portions 12, 22, 36 can be connected directly to wire harness terminals (not shown).

The invention claimed is:

1. A fusible link unit which is fastened to a battery post clamp terminal clamped to an on-vehicle battery, comprising:

a bus bar made from a metal plate and comprising:

a battery terminal formed at one end of the bus bar, including at least two mounting edges, and a plurality of fastening holes provided thereon, continuously joined together at their perimeters so as to form a unified opening, and the unified opening receives a fastening member of the battery post clamp terminal, each of the fastening holes corresponding to a respective one of the mounting edges, wherein a relative position of the battery terminal, with respect to the fastening member received therein, shifts via the perimeters of the fastening holes; and at least one fusible portion provided at another end of the bus bar opposite to the one end having the battery terminal; and a resin case covering the bus bar except for the at least one fusible portion, wherein the fuse link unit fastens to the battery post clamp terminal by the fastening member, and the fuse link unit shifts, while the fastening member is received in the unified opening, in a direction of mounting a selected one of the at least two mounting edges of the battery terminal into abutment with a portion of the battery post clamp terminal.

2. The fusible link unit according to claim 1, wherein the battery terminal includes two mounting edges and the fastening holes are integrally formed into a twofold leaf shape.

3. The fusible link unit according to claim 1, wherein the battery terminal includes three mounting edges and the fastening holes are integrally formed into a trefoil shape.

4. The fusible link unit according to claim 1, wherein the fastening holes are integrally formed into a single rectangular shape.

5. The fusible link unit according to claim 1, wherein the fastening holes are respectively formed into a circular shape; and a first distance between a center of a first one of the fastening holes and the respective mounting edge is shorter than a second distance between a center of a second one of the fastening holes and the respective mounting edge.

6. The fusible link unit according to claim 1, wherein the battery terminal further includes a resin position regulation member provided at lateral ends of each mounting edge.

7. The fusible link unit according to claim 1, wherein the bus bar has an L-shape.

8. The fusible link unit according to claim 1, wherein the battery terminal is flat so as to be disposed parallel to an upper surface of the on-vehicle battery while the fastening member is received in the unified opening, and the direction of mounting is parallel to the upper surface of the on-vehicle battery while the fastening member is received in the unified opening.

* * * * *